US012664934B2

(12) United States Patent
Yamada

(10) Patent No.: US 12,664,934 B2
(45) Date of Patent: Jun. 23, 2026

(54) TILING PANEL, SELF-LUMINOUS PANEL, AND MANUFACTURING METHOD

(71) Applicant: Magnolia Blue Corporation, Tokyo (JP)

(72) Inventor: Jiro Yamada, Tokyo (JP)

(73) Assignee: MAGNOLIA BLUE CORPORATION, Tokyo (JP)

( * ) Notice: Subject to any disclaimer, the term of this patent is extended or adjusted under 35 U.S.C. 154(b) by 0 days.

(21) Appl. No.: 18/576,119

(22) PCT Filed: Jul. 5, 2021

(86) PCT No.: PCT/JP2021/025331
§ 371 (c)(1),
(2) Date: Jan. 3, 2024

(87) PCT Pub. No.: WO2023/281589
PCT Pub. Date: Jan. 12, 2023

(65) Prior Publication Data
US 2024/0242665 A1    Jul. 18, 2024

(51) Int. Cl.
*G09G 3/3208* (2016.01)
*G02B 5/30* (2006.01)
*G09G 3/00* (2006.01)

(52) U.S. Cl.
CPC ......... *G09G 3/3208* (2013.01); *G02B 5/3025* (2013.01); *G09G 3/035* (2020.08); *G09G 2300/026* (2013.01)

(58) Field of Classification Search
CPC ...... G09F 9/301; H10K 59/18; G02B 5/3025; G09G 3/035; G09G 3/3208; G09G 2300/026; G09G 3/00
See application file for complete search history.

(56) References Cited

U.S. PATENT DOCUMENTS

| | | | | |
|---|---|---|---|---|
| 10,714,451 B2 * | 7/2020 | Lee | ......................... | H10K 50/85 |
| 11,320,665 B2 * | 5/2022 | Sharp | ................... | G02B 5/3016 |
| 11,809,619 B1 * | 11/2023 | Yokoyama | ......... | G02B 27/0093 |
| 2011/0193814 A1 * | 8/2011 | Gay | ....................... | G02B 30/25 |
| | | | | 345/173 |
| 2012/0069273 A1 | 3/2012 | Watanabe | | |

(Continued)

FOREIGN PATENT DOCUMENTS

| | | |
|---|---|---|
| CN | 112309245 A | 2/2021 |
| JP | H10232365 A | 9/1998 |

(Continued)

OTHER PUBLICATIONS

International Search Report and Written Opinion mailed on Sep. 14, 2021, received for PCT Application PCT/JP2021/025331, filed on Jul. 5, 2021, 09 pages including English Translation.

*Primary Examiner* — Olga V Merkoulova
(74) *Attorney, Agent, or Firm* — XSENSUS LLP

(57) ABSTRACT
A tiling panel can comprise a plurality of self-luminous panels. Each of the self-luminous panels can have a main display area as a display area on the front side. A sub-display area can be connected to the display area can have a part that bends toward the back of the panel. Two self-luminous panels that meet each other can be arranged so that the sub-display areas of each other are close to each other. In the sub-display area, a circularly polarizing layer may be formed on the light input/output path.

17 Claims, 20 Drawing Sheets

(56)          References Cited

U.S. PATENT DOCUMENTS

| | | | |
|---|---|---|---|
| 2013/0342975 A1 | 12/2013 | Kim et al. | |
| 2015/0369981 A1* | 12/2015 | Takeda .................. | G02B 5/3025 |
| | | | 359/488.01 |
| 2016/0132281 A1* | 5/2016 | Yamazaki ............. | G06F 1/1643 |
| | | | 345/1.3 |
| 2016/0155788 A1* | 6/2016 | Kwon .................. | H10K 59/131 |
| | | | 257/40 |
| 2017/0141173 A1 | 5/2017 | Choi et al. | |
| 2017/0351147 A1* | 12/2017 | Akutagawa ......... | G02F 1/13363 |
| 2018/0101020 A1* | 4/2018 | Gollier ................. | G02B 27/022 |
| 2019/0035765 A1 | 1/2019 | Kim et al. | |
| 2019/0067411 A1 | 2/2019 | Lee et al. | |
| 2019/0164932 A1* | 5/2019 | Lee ...................... | G02B 6/0055 |
| 2019/0271853 A1* | 9/2019 | Sharp ................... | G02B 27/286 |
| 2020/0214149 A1 | 7/2020 | Lee et al. | |
| 2022/0373729 A1* | 11/2022 | Yonemoto .......... | G02B 27/0018 |

FOREIGN PATENT DOCUMENTS

| | | | |
|---|---|---|---|
| JP | 2014-106382 | A | 6/2014 |
| JP | 2014-119562 | A | 6/2014 |
| JP | 2014-170221 | A | 9/2014 |
| JP | 2016-095502 | A | 5/2016 |
| JP | 2019-045861 | A | 3/2019 |
| JP | 2021-111611 | A | 8/2021 |
| WO | 2010/140537 | A1 | 12/2010 |
| WO | 2014/092112 | A1 | 6/2014 |
| WO | 2016/042674 | A1 | 3/2016 |

* cited by examiner

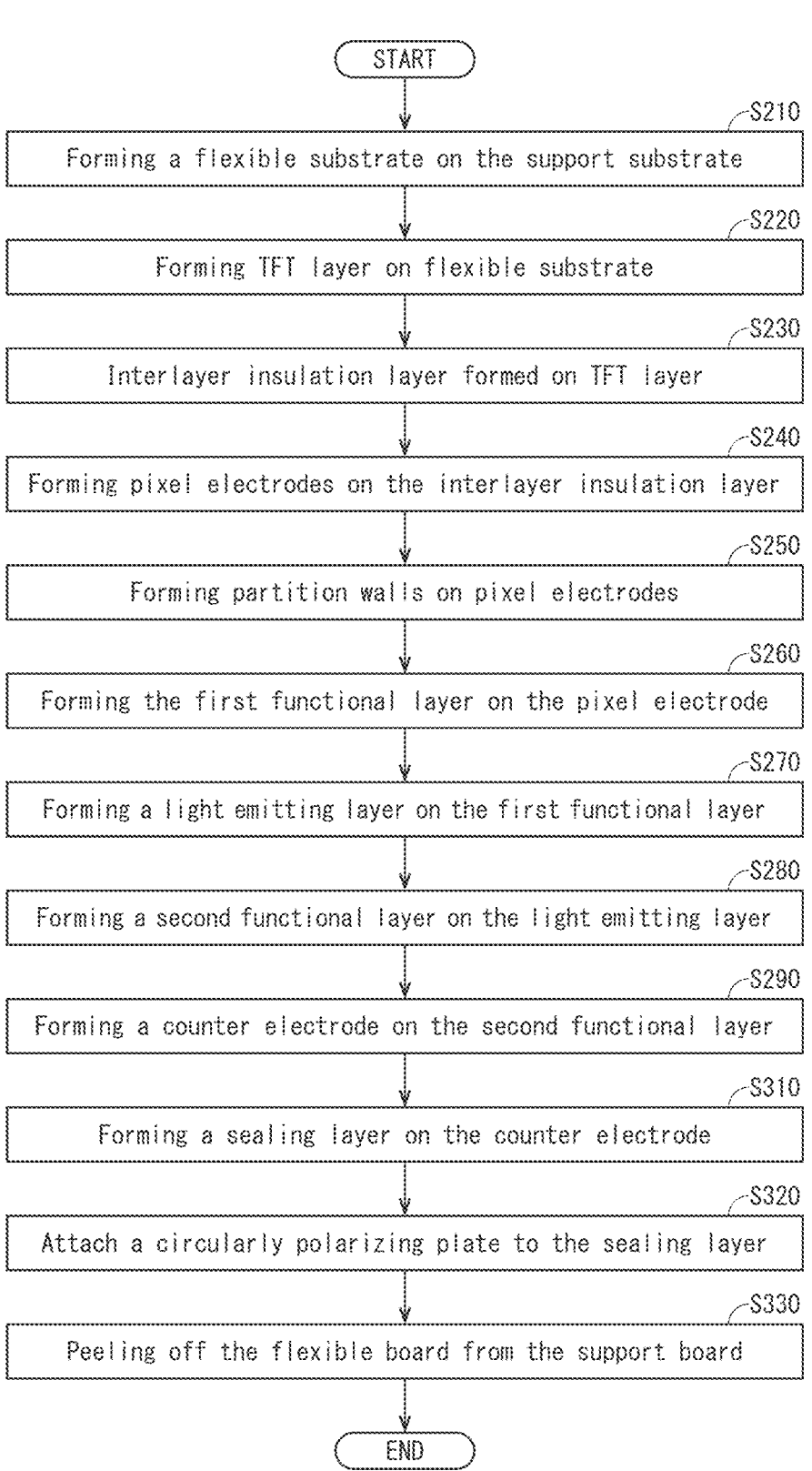

START

S210
Forming a flexible substrate on the support substrate

S220
Forming TFT layer on flexible substrate

S230
Interlayer insulation layer formed on TFT layer

S240
Forming pixel electrodes on the interlayer insulation layer

S250
Forming partition walls on pixel electrodes

S260
Forming the first functional layer on the pixel electrode

S270
Forming a light emitting layer on the first functional layer

S280
Forming a second functional layer on the light emitting layer

S290
Forming a counter electrode on the second functional layer

S310
Forming a sealing layer on the counter electrode

S320
Attach a circularly polarizing plate to the sealing layer

S330
Peeling off the flexible board from the support board

END

FIG. 18A
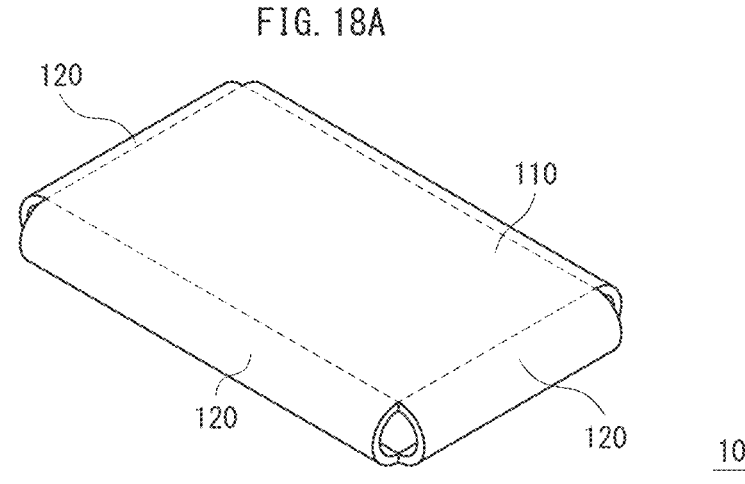
120
110
120
120
10
FIG. 18B
120
110
120
120
120
20
FIG. 18C
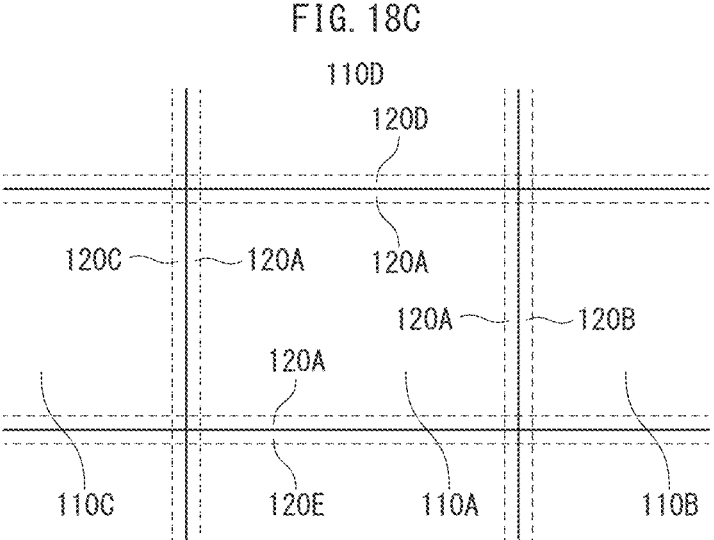
110D
120D
120C    120A    120A
120A    120B
120A
110C    120E    110A    110B FIG. 20A
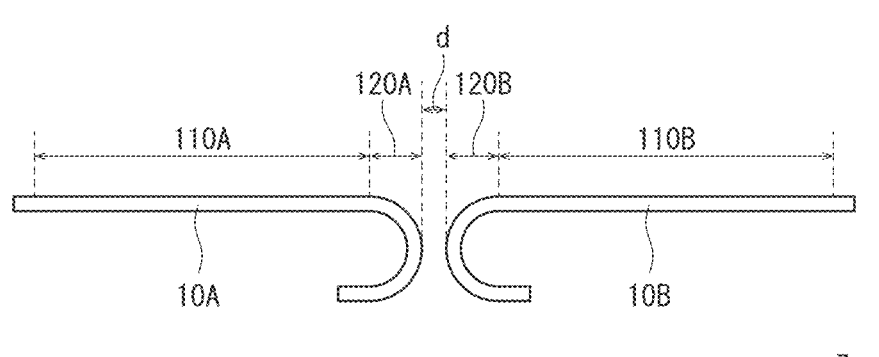
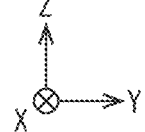
FIG. 20B
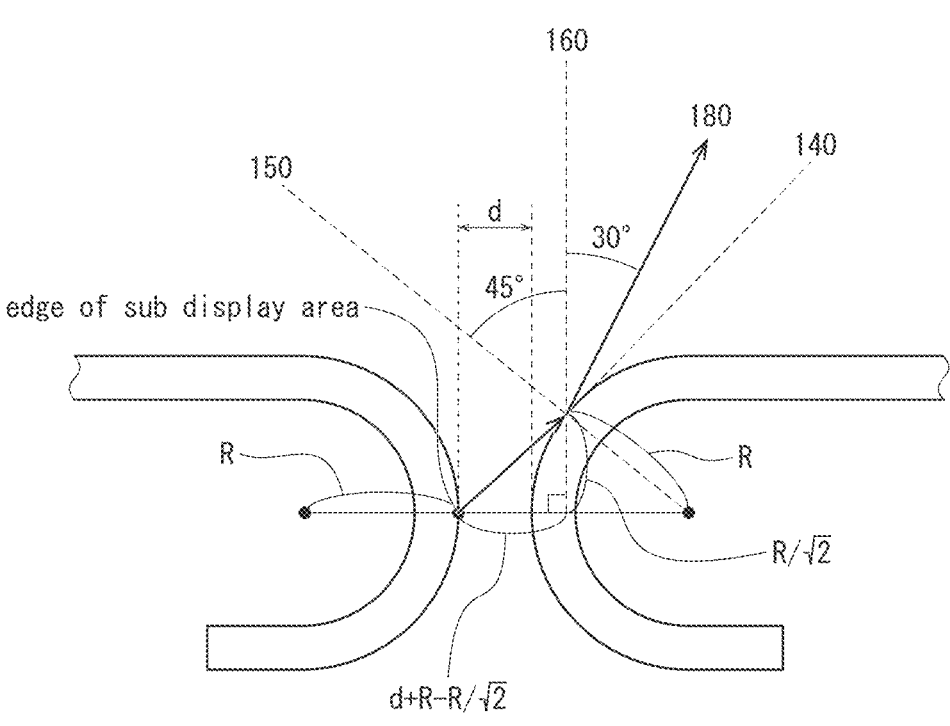
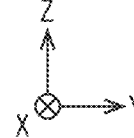

TILING PANEL, SELF-LUMINOUS PANEL, AND MANUFACTURING METHOD

CROSS-REFERENCE TO RELATED APPLICATION

The present application is based on PCT filing PCT/JP2021/025331, filed Jul. 5, 2021, the entire contents of which are incorporated herein by reference.

TECHNICAL FIELD

This disclosure relates to tiling display which is used as one display device by arranging a plurality of display panels, display panels as a component, and a method of manufacturing the display panel.

BACKGROUND ART

In recent years, development of self-luminous panels that utilize light emission such as organic EL (Electroluminescence) elements and QLED (Quantum-dot Light Emitting Diode) elements have been actively conducted. A self-luminous element has a structure in which thin films of various materials are laminated. A thin film transistor substrate is provided with at least a pixel electrode, a counter electrode, and a light emitting layer which is sandwiched between them.

The thin film transistor substrate is covered with a planarizing insulating layer.

In recent years, a so-called tiling panel has been proposed for display devices which is used these self-emitting panels. In this method, a display device is constructed by arranging a plurality of self-luminous panels.

For example, Patent Literature 1 discloses a foldable display device which is configured by arranging two flexible self-luminous panels.

The two self-emitting panels in Patent Literature 1 are bent and arranged so that the light-emitting surfaces are on the outside. The individual self-luminous panels are arranged so that the folded portions are close to each other to avoid the occurrence of non-display areas at the seams of the self-luminous panels. By this configuration, display devices can seamlessly display images, etc.

CITATION LIST

Patent Literature

[Patent Literature 1] US Patent Application Publication No 2017/0141173
[Patent Literature 2] US Patent Application Publication No 2013/0342975

SUMMARY

Technical Problem

Self-luminous panels are applied surface treatments, and film attachment etc. to suppress so-called reflection that is a deterioration of display quality due to external light reflection.

However, the tiling panels have possibility of not working well with preventing reflections structure.

An object of the present disclosure is to provide a tiling display having a structure that suppresses deterioration in display quality caused by light reflection at seams of self-luminous panels.

Solution

The tiling panel according to one aspect of the present disclosure is characterized by the tiling panel is formed by arranging a plurality of self-luminous panels, comprising; A plurality of self-luminous panels, a display area on a front side of each of self-luminous panel includes a main display area and a sub-display are; the sub-display area has a part that bends toward the back of the self-luminous panel, and connected to the main display area; and wherein two adjacent self-luminous panels are arranged so that their sub-display areas are close to each other; a circularly polarizing layer is provided in the optical path of the incident and/or emitting light of the sub-display area.

Advantageous Effects

The tiling panel according to the above aspect, since the circularly polarizing plate is present on the panel surface even in the sub-display area, there is a no path through for external light reflection without passing through the circularly polarizing plate between the two facing self-luminous panels.

It is possible to prevent display quality from deteriorating by light reflection at the joints of self-luminous panels, and it makes possible to improve display quality.

BRIEF DESCRIPTION OF DRAWINGS

FIG. 8 is a schematic cross-sectional view illustrating a path which the light is emitted from one self-luminous panel 10 and reflected by the other self-luminous panel 10 in the sub-display area 120 pertaining to the second embodiment.

FIG. 9 is a schematic plan view showing an example of the arrangement of polarization axes according to Modification 1 and Modification 2.

FIG. 13 is a flowchart showing the manufacturing process of the self-luminous film panel pertaining to the third embodiment.

FIG. 14 is a partial cross-sectional view schematically showing a part of the manufacturing process of the self-luminous film panel pertaining to the third embodiment.

FIG. 15 schematically shows a part of the manufacturing process of the self-luminous film panel pertaining to Embodiment 3.

FIG. 16 is a partial cross-sectional view schematically showing a part of the manufacturing process of the self-luminous film panel pertaining to the third embodiment.

FIG. 17 is a partial cross-sectional view schematically showing a part of the manufacturing process of the self-luminous panel pertaining to the third embodiment.

FIG. 18 is a schematic diagram showing the configuration of a self-luminous panel pertaining to a modified example.

FIG. 20 is a schematic cross-sectional view showing the configuration of a self-luminous panel pertaining to a modified example.

DESCRIPTION OF EMBODIMENTS

Overview of Embodiment of Present Disclosure

Figure 1:
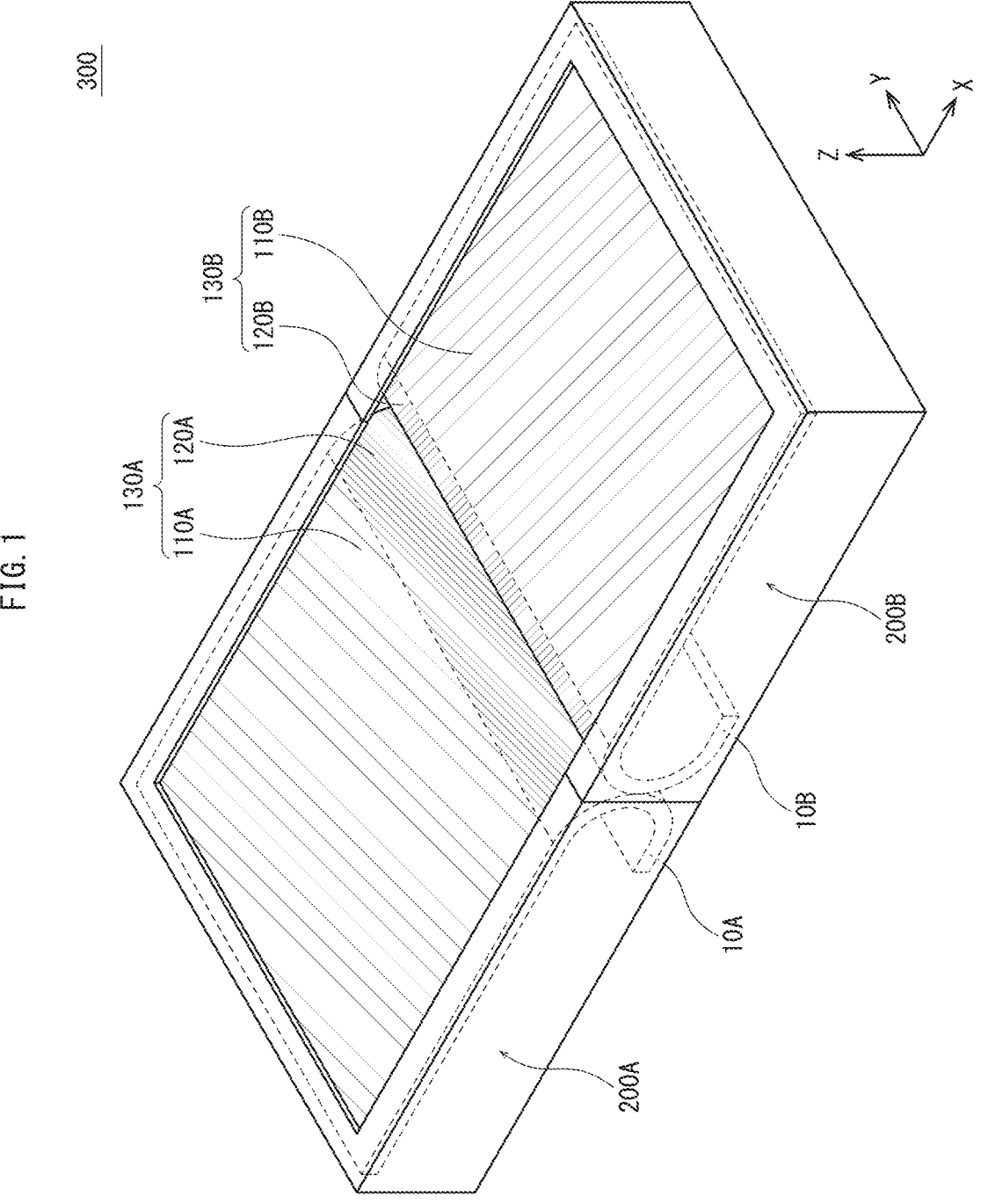
FIG. 1 is a schematic external view of a display device 300 pertaining to a first embodiment.

The tiling panel according to one aspect of the present disclosure is characterized by 1. The tiling panel is formed by arranging a plurality of self-luminous panels, comprising;

A plurality of self-luminous panels, a display area on a front side of each of self-luminous panel includes a main display area and a sub-display are; the sub-display area has a part that bends toward the back of the self-luminous panel, and connected to the main display area; and wherein two adjacent self-luminous panels are arranged so that their sub-display areas are close to each other; a circularly polarizing layer is provided in the optical path of the incident and/or emitting light of the sub-display area.

Advantageous Effects

The tiling panel according to the above aspect, since the circularly polarizing plate is present on the panel surface even in the sub-display area, there is a no path through for external light reflection without passing through the circularly polarizing plate between the two facing self-luminous panels. It is possible to prevent display quality from deteriorating by light reflection at the joints of self-luminous panels, and it makes possible to improve display quality.

Furthermore, the tiling panel of the above embodiment may have the following embodiment.

It may also be referred to as the tiling panel wherein the circularly polarizing layer extends from the sub display area and arrives the main display area.

With such a configuration, reflection of external light can be suppressed even in the main display area.

Also, it may be referred to as the tiling panel wherein the circularly polarizing layer in is formed over the entire main display area.

With such a configuration, reflection of external light can be suppressed in the entire main display area and sub display area; furthermore, the tiling panel can be manufactured easily.

Also, it may be referred to as the tiling panel wherein the circularly polarizing layer is composed of an upper layer and a lower layer, and the lower layer has a quarter wavelength plate, and the upper layer has a linear polarizing plate.

With such a configuration, a circularly polarizing layer can be easily realized

Also, it may be referred to as the polarization axis of the linear polarizer in one sub-display area is orthogonal to the polarization axis of the linear polarizer in the other sub-display area, the one sub-display area and the other sub-display area are located on each of two adjacent self-luminous panels.

With such a configuration, it is possible to prevent the display of one self-luminous panel from being reflected in the sub-display area of the other self-luminous panel.

Also, it may be referred to as the tiling panel, the first self-luminous panels and the second self-luminous panels are arranged alternately, and the third self-luminous panels and the fourth self-luminous panels are arranged alternately; the first self-luminous panels are arranged in rows along a first direction, and arranged in rows along a second direction orthogonal to the first direction, and has a linear polarizing plate which polarization axis is in a third direction in the first direction;

the second self-luminous panel has a linear polarizing plate which polarization axis is in the fourth direction, the fourth direction is orthogonal to the third direction; the third self-luminous panel has a linear polarizing plate which polarization axis is in the third direction in the second direction; the fourth self-luminous panel has a linear polarizing plate which polarization axis is in the fourth direction.

With such a configuration, it is possible to prevent the display of a self-luminous panel from being reflected in the sub-display area of an adjacent self-luminous panel, and the self-luminous panel is arranged two-dimensionally. The tiling panels can be easily realized.

Also, it may be referred to as In the tiling panel, the self-luminous panel has a 45-degree angle between the first direction and the third direction.

With this configuration, it is possible to suppress uneven brightness between adjacent self-luminous panels when viewing through a polarizing plate which polarization axis is in the first direction or the second direction.

Also, it may be referred to as the tiling panels, the self-luminous panel includes a support member, a flexible substrate placed on the support member, and a circularly polarizing layer attached to the flexible substrate, the flexible substrate is provided with a plurality of light emitting elements.

With such a configuration, a self-luminous panel can be easily formed.

It may also be referred to the self-luminous panel includes an organic EL element as a light emitting element.

Also, it may be referred to as Manufacturing method for manufacturing the tiling panel when the circularly polarizing layer is formed in the sub-display area of the self-emissive panel, arranging a plurality of self-emissive panels.

This process ensures that the circularly polarizing layer is placed on the surface of the sub-display area of each self-emitting panel can be formed.

Also referred to as the tiling panel formed by arranging a plurality of self-luminous panels, comprising; a plurality of self-luminous panel, a display area on a front side of each of self-luminous panel includes a main display area and a sub-display are; the sub-display area has a part that bends toward the back of the self-luminous panel, and connected to the main display area and; wherein two adjacent self-luminous panels are arranged so that their sub-display areas are close to each other; a linear polarizing layer is provided in the optical path of a incident and/or emitting light of the sub-display area; the polarization axis of the linear polarizer in one sub-display area is orthogonal to the polarization axis of the linear polarizer in the other sub-display area, the one sub-display area and the other sub-display area are located on each of two adjacent self-luminous panels.

According to the tiling panel of the above aspect, it is possible to prevent the display of one self-luminous panel from being reflected in the sub-display area of the other self-luminous panel.

The self-luminous panel pertaining to one aspect of the present embodiment is referred to as a self-luminous panel constituting a tiling panel, the tiling panel which composed by arranging plurality of self-luminous panels, is comprising; a plurality of self-luminous panels, a display area on a front side of each of self-luminous panel includes a main display area and a sub-display are; the sub-display area has a part that bends toward the back of the self-luminous panel, and connected to the main display area; and wherein two adjacent self-luminous panels are arranged so that their sub-display areas are close to each other; a circularly polarizing layer is provided in the optical path of a incident and/or emitting light of the sub-display area, the polarization axis of the linear polarizer in one sub-display area is orthogonal to the polarization axis of the linear polarizer in the other sub-display area, the one sub-display area and the other sub-display area are located on each of two adjacent self-luminous panels.

According to the self-emissive panel of the above aspect, when a plurality of self-emissive panels are arranged to form a tiling panel, reflection of external light in the sub-display area can be suppressed.

Embodiment 1

1. Schematic Configuration of Display Device

A display device pertaining to the present disclosure will be described.

FIG. 1 is an external view of a display device 300 pertaining to the first embodiment. As shown in FIG. 1, the display device 300 includes a display device unit 200A and a display device unit 200B. Note that the display device unit 200A and the display device unit 200B have the same configuration except for the directions of their outer circumferential surfaces facing each other. These will be referred to as the display device unit 200 when it is not distinguished the directions.

The display device unit 200 includes a self-luminous panel 10.

Figure 2A:
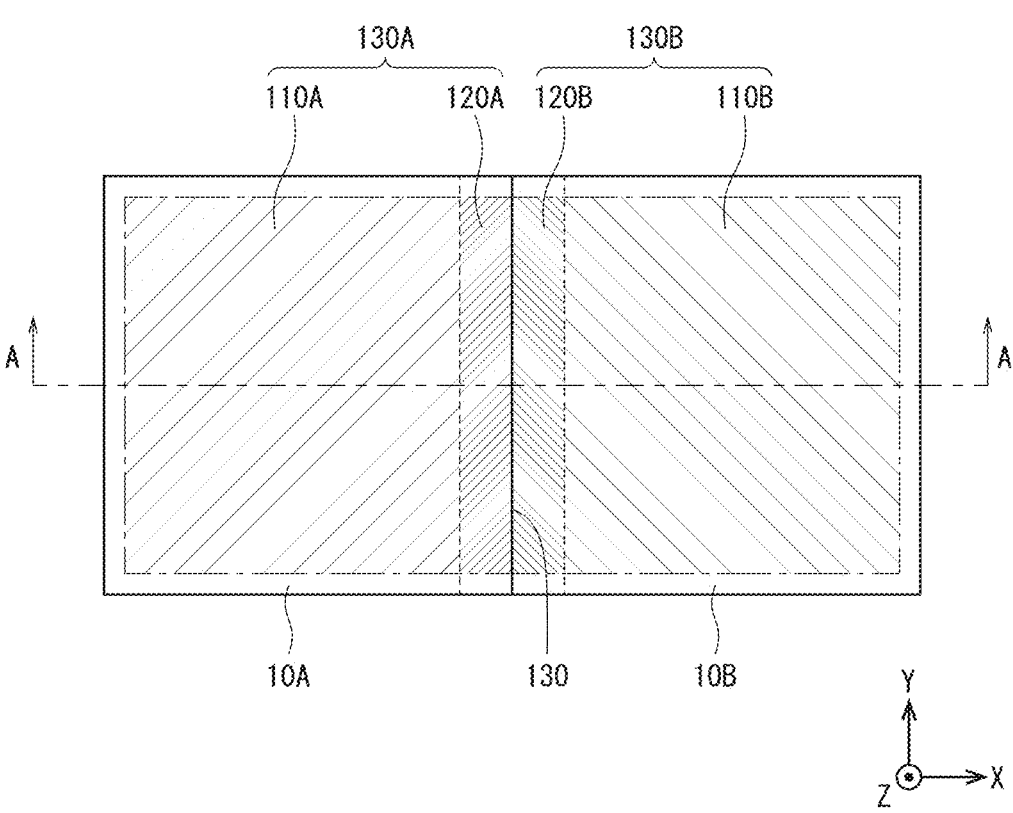
FIG. 2A is a schematic plan view of the self-luminous panel 10 in the display device 300 pertaining to the first embodiment.

FIG. 2A is a schematic plan view of the self-emissive panel 10A of the display device unit 200A and the self-emissive panel 10B of the display device unit 200B in the display device 300 pertaining to the first embodiment, viewed from the front.

The self-luminous panel 10 is a self-luminous panel that emits light in the z direction (the front side of the paper in FIG. 1), and one edge is bent to the opposite direction from the light emission direction.

The display area 130 is formed on the upper surface side of the self-luminous panel 10 and includes a flat main display area 110 and a sub-display area 120 that is curved so that the light emission side is on the outside. As shown in FIG. 2A, the display area 130A of the display device unit 200A has a main display area 110A and a sub-display area 120A following the main display area 110A, and the sub-display area 120A is connected to the linear connection area 130B of the display device unit 200B.

Figure 2B:
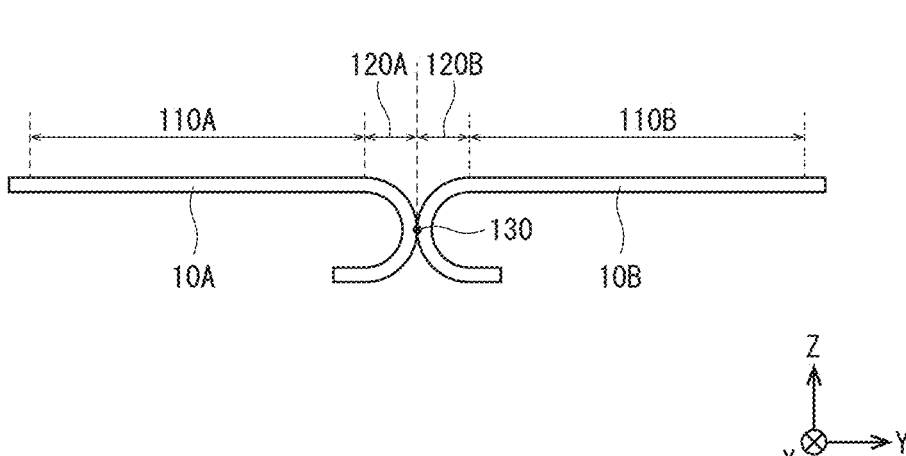
FIG. 2B is a schematic cross-sectional view of the self-luminous panel 10 in the display device 300.

Similarly, the display area 130B of the display unit 200B has a main display area 11 OB and a sub-display area 120B is following it, and the sub-display area 120B is connected to the display area 130A of the display unit 200A in a linear connection area 130. FIG. 2B is a schematic cross-sectional view of the self-luminous panels 10A and 10B which are along the A-A cross section in FIG. 2A. As shown in FIG. 2B, the end surface of the self-emissive panel 10A facing the self-emissive panel 10B is bent toward the opposite side of the light emission side, It has a main display area 110A in the flat part, and a sub display area 120A in the bent part from the boundary with the flat part to the connection area 130 with the self-luminous panel 10B. Similarly, the self-emissive panel 10B has an end surface facing the self-emissive panel 10A bent toward the side opposite to the light emission side, and has a main display area 110B in a flat portion. The sub-display area 120B extends from the boundary with the flat part in the bent part to the connection area 130 with the self-luminous panel 10A.

Therefore, in the display device 300, two sub-display areas 120 exist between two main display areas 110, and these are continuous without gaps, forming one continuous display area.

2. Configuration of Self-Luminous Panel 10

Figure 3:
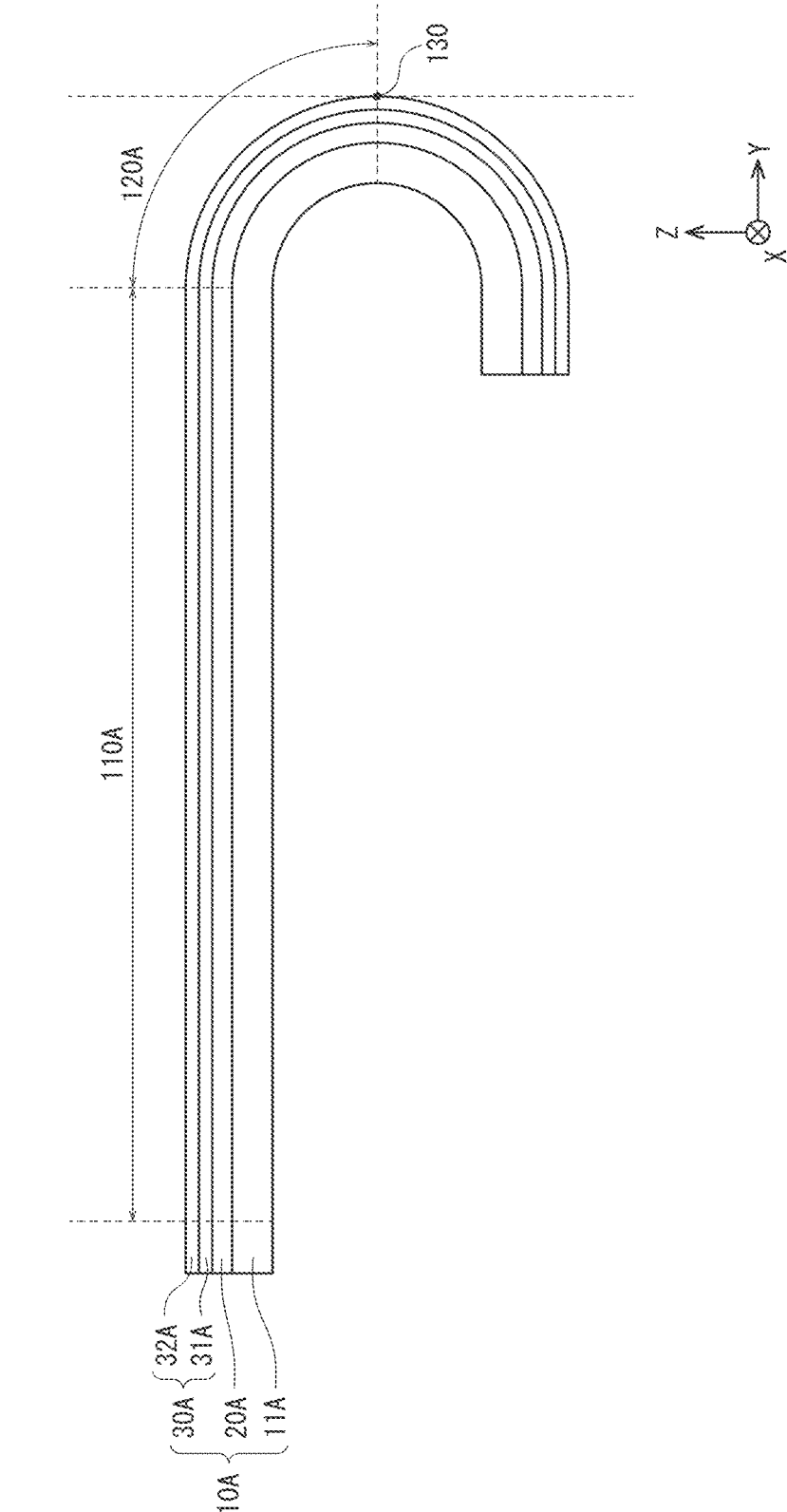
FIG. 3 is a schematic cross-sectional view of the self-luminous panel 10 pertaining to the first embodiment.

FIG. 3 is a schematic cross-sectional view of the self-luminous panel 10A, and corresponds to the A-A cross section in FIG. 2A. As shown in FIG. 3, the self-luminous panel 10A includes a support member 11A, a self-luminous film panel 20A, and a circularly polarizing plate 30A. In addition, since the structure of the self-emissive panel 10B is also the same, the self-emissive panels 10A and 10B will be described below without distinguishing between them.

The support member 11 is a member that supports the self-luminous film panel 20, which is a flexible film, and it includes glass, silicon, metals such as copper, zinc, aluminum, stainless steel, magnesium, iron, nickel, gold and silver, and Plastic etc. can be adopted.

As the plastic material, either thermoplastic resin or thermosetting resin may be used. For example, polyethylene, polypropylene, polyamide, polyimide (PI), polycarbonate, acrylic resin, polyethylene terephthalate (PET), polybutylene terephthalate, polyacetal, other fluororesins, styrene, polyolefin, polyvinyl chloride, polyurethane, for examples include various thermoplastic elastomers such as fluororubber-based and chlorinated polyethylene-based elastomers, epoxy resins, unsaturated polyesters, silicone resins, polyurethanes, etc., or copolymers, blends, and polymer alloys mainly based on a laminate obtained by laminating one type or two or more types of these can be used.

The support member 11 has the shape of a rectangular flat plate with one side bent.

Specifically, the end facing the other self-luminous panel 10 is bent so that the circularly polarizing plate side is on the outside, when it is viewed from the side and it is J-shaped. In the first embodiment, the bent portion is a curved surface with R=5 mm.

The self-luminous film panel 20 is a flexible self-luminous panel in which a switching element and a light emitting element are arranged on a flexible substrate.

Specifically, for example, a TFT laver, an interlayer insulating layer, and a light emitting element layer are laminated in this order on a flexible substrate such as polyethylene terephthalate (PET).

The self-luminous film panel 20 is a so-called top emission type self-luminous panel that emits light toward the circularly polarizing plate 30 side.

The self-luminous film panel 20 has a substantially rectangular shape, the peripheral part is a non-display part, and the area other than the peripheral part is a display part. The self-luminous film panel 20 is attached to the support member 11 so that the display section spans the main display area 110 and the sub-display area 120 of the self-luminous panel 10.

The circularly polarizing plate 30 is a member that suppresses glare due to reflection of external light on the surface and inside of the self-luminous film panel 20. In this embodiment, the circularly polarizing plate 30 includes a quarter wavelength plate 31 and a linearly polarizing plate 32.

The quarter-wave plate 31 has a dependence on the plane of polarization with respect to the moving speed of light transmitted in a direction orthogonal to its surface.

More specifically, the target light of the quarter-wave plate 31 is a light which polarization plane is in one direction orthogonal to a delay axis, the delay axis is in one direction along the surface, the quarter-wave plate 31 delays the phase of light with a plane of polarization parallel to the delay axis by 90° (π/2), the linear polarizing plate 32 has a dependence on the plane of polarization with respect to the transmittance of light transmitted in a direction orthogonal to its surface, and only transmits light having a specific plane as the plane of polarization.

The circularly polarizing plate 30 closely covers the self-luminous film panel 20 at least in the sub-display area 120. In the first embodiment, the circularly polarizing plate 30 tightly covers the entire upper surface of the self-luminous film panel 20.

3. Configuration and Effect of Circularly Polarizing Plate 30

(1) Configuration for Suppressing Reflection of External Light

A configuration for suppressing reflection of external light by the circularly polarizing plate 30 will be described below.

First, suppression of external light reflection in the main display area 110 will be described.

Figure 4A:
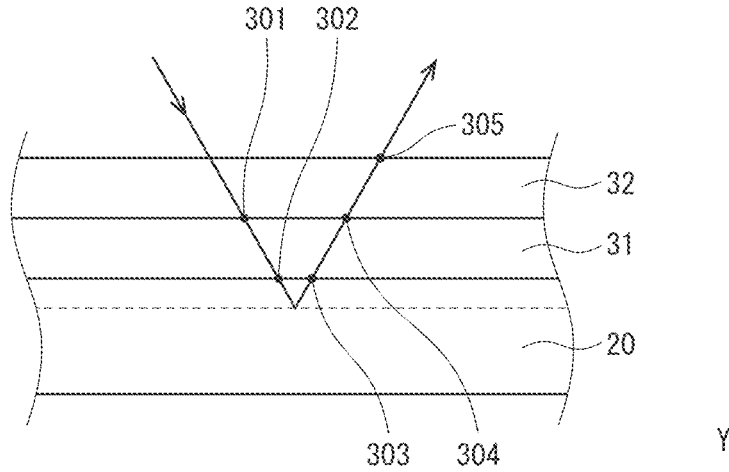
FIG. 4 is a schematic diagram illustrating a configuration for suppressing reflection of external light in the main display area 110 of the self-luminous panel 10 pertaining to the first embodiment.

FIG. 4A is a schematic cross-sectional view showing the path of light when external light incident on the main display area 110 is reflected. The delay axis of the quarter-wave plate 31 and the polarization axis of the linear polarizing plate 32 form a predetermined angle that is neither parallel nor orthogonal, and in this embodiment forms an angle of 45°.

In the first embodiment, the delay axis of the quarter-wave plate 31 is parallel to the Y-axis, and the polarization axis of the linear polarizing plate 32 is inclined at 45° degrees in the Y-axis direction with respect to the X-axis FIG. 4B to FIG. 4E are plan views which is showing polarization planes of external light or reflected external light on the light path of FIG. 4A.

Figure 4B:
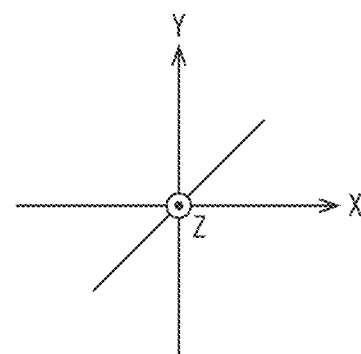

The linear polarizing plate 32 transmits only linearly polarized light parallel to its polarization plane, so when external light passes through the linear polarizing plate 32 and reaches the position 301, the linear polarizing plate 32 passes through the linear polarizing plate 32 as shown in FIG. 4B, it becomes linearly polarized light parallel to the polarization axis of polarizing plate 32.

That is, linearly polarized light that is inclined at 450 degrees with respect to the delay axis is incident on the quarter-wave plate 31.

Next, when external light passes through the quarter-wave plate 31, the phase of the Y-axis component parallel to the delay axis is delayed by 90° (π/2) from the phase of the X-axis component orthogonal to the delay axis.

Figure 4C:
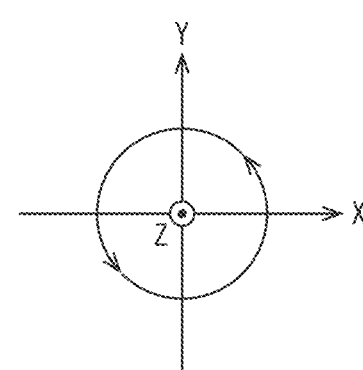

Therefore, when the external light passes through the quarter-wave plate 31 and reaches the position 302, it becomes counterclockwise circularly polarized light, as shown in FIG. 4C Then, the counterclockwise circularly polarized light transmitted through the quarter-wave plate 31 is reflected inside the self-luminous film panel 20, for example, at the pixel electrode of the light-emitting element, and enters the quarter-wave plate 31 again at position 303.

Figure 4D:
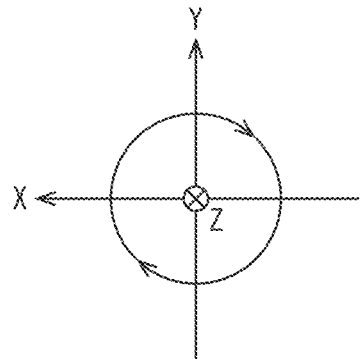

When light is reflected inside the self-luminous film panel 20, it becomes a mirror image of the self-luminous film panel 20 as shown in FIG. 4D. That is, when the self-luminous film panel 20 is used as a reference, the rotation direction of the polarized light remains the same, and the Z component of the light traveling direction is reversed.

On the other hand, when the light is used as a reference, the light becomes circularly polarized in a clockwise direction with respect to the traveling direction.

Furthermore, when the reflected light passes through the quarter-wave plate and reaches position 304, the phase of the Y-axis component parallel to the delay axis is delayed 90° (π/2) degree from the phase of the X-axis component orthogonal to the delay axis. Only to be further delayed. Therefore, the phase of the Y-axis component, which is the delay axis, delaying behind the phase of the X-axis component, which is orthogonal to the delay axis, by 180° (π), so the phase of the Y-axis component is reversed with respect to the state at position 301.

That is, with respect to the state at position 301, the direction of the polarization plane becomes symmetrical with respect to the X axis.

Figure 4E:
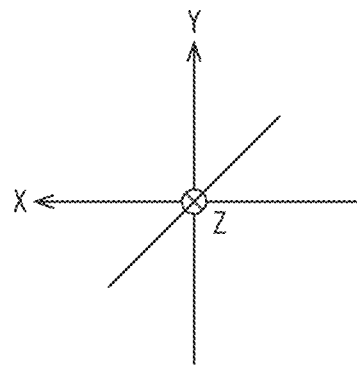

Therefore, as shown in FIG. 4(e), the reflected light becomes linearly polarized light which plane of polarization is tilted by 45° in the −Y direction with respect to the X axis at position 304.

Since the polarization plane of this linearly polarized light is orthogonal to the polarization axis of the linearly polarized plate 32, the reflected light cannot pass through the linearly polarized plate 32 and does not reach the position 305.

That is, the external light that enters the circularly polarizing plate 30 and is reflected on the surface or inside of the self-luminous film panel 20 cannot pass through the circularly polarizing plate 30 again, so the surface or inside of the self-luminous film panel 20 becomes a reflective surface. It is possible to prevent such external light reflection.

(2) Reflection of External Light in the Sub-Display Area

The differences between Comparative Example 1 and Embodiment 1 will be explained regarding external light reflection in the sub-display area below.

Figures 5A, 5B:
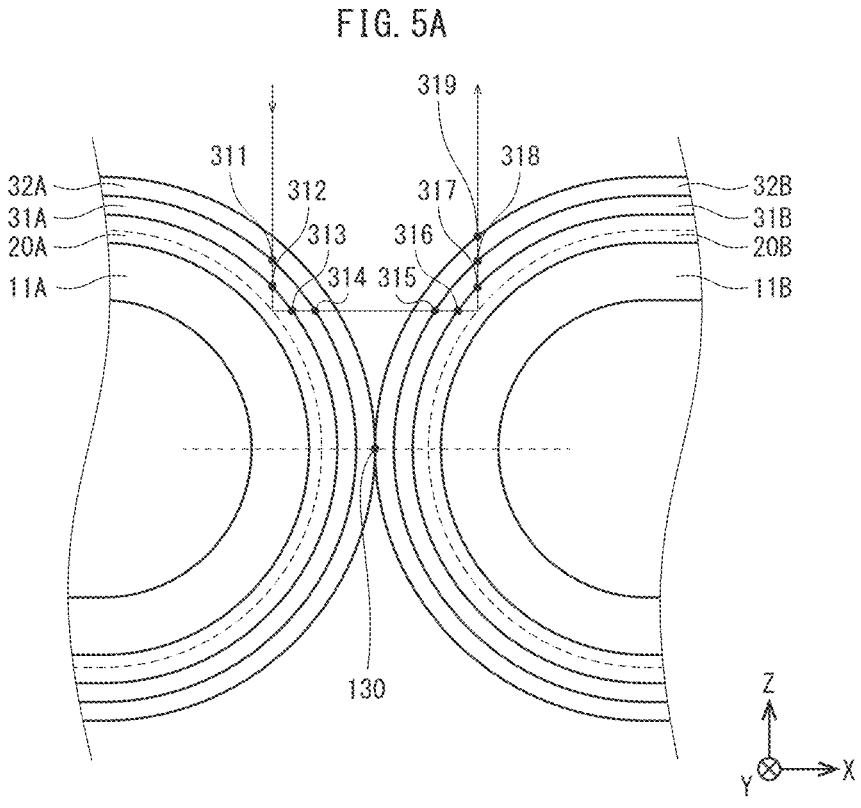
FIG. 5 is a schematic cross-sectional view illustrating the reflection path of external light in the sub-display area 120 in the first embodiment and the first comparative example.

FIG. 5B is a schematic cross-sectional view showing an external light reflection path in the sub-display area in Comparative Example 1 In Comparative Example 1, each of the self-luminous panels 10A and 10B do not have a circularly polarizing plate, but a plate-shaped circularly polarizing plate 30X is attached and straddle the display area 130A of the self-luminous panel 10A and the display area 130B of the self-luminous panel 10B is attached.

That is, in the sub-display area according to Comparative Example 1, the circularly polarizing plate 30X and the self-luminous film panel 20 are not in close contact with each other.

In this case, as shown in FIG. 5B, the external light transmitted through the circularly polarizing plate 30X is reflected inside the self-luminous film panel 20A of the self-luminous panel 10A, and then reflected again inside the self-luminous film panel 20B, there is an optical path returning to the circularly polarizing plate 30X In this case, as described below, the mechanism for suppressing reflection of external light by the circularly polarizing plate 30X does not function.

FIG. 6A to FIG. 6F are plan views showing polarization planes of external light or reflected external light on the optical path of FIG. 5B.

Figure 6A:
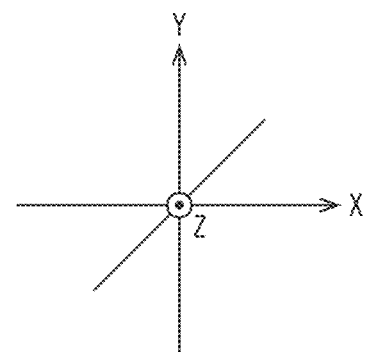
FIG. 6 is a schematic diagram illustrating the reason why reflection of external light cannot be suppressed in the main display area of the self-luminous panel pertaining to Comparative Example 1.
Figure 6B:
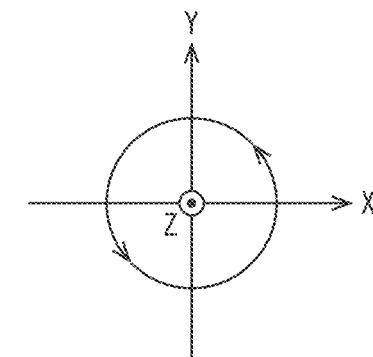

As shown in FIG. 6A, the position 321 is a position where the external light transmitted through the linearly polarizing plate 32X becomes linearly polarized light parallel to the polarization axis of the linearly polarizing plate 32X. Next, when the external light passes through the quarter-wave plate 31X and reaches the position 302, it becomes counterclockwise circularly polarized light, as shown in FIG. 6B.

Then, the counterclockwise circularly polarized light transmitted through the quarter-wave plate 31X is reflected inside the self-luminous film panel 20A, further, the light is reflected inside the self-luminous film panel 20B and enters the quarter-wave plate 31X again at a position 324.

Figure 6C:
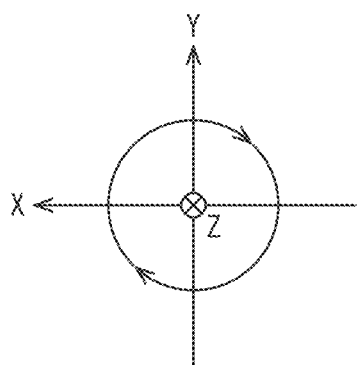
Figure 6D:
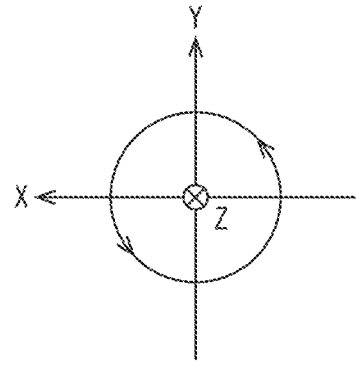

At position 323, the reflected light reflected inside the self-luminous film panel 20A becomes clockwise circularly polarized light that is reversely rotated with respect to position 322, as shown in FIG. 6C. The position 324 is a position where the reflected light reflected inside the self-luminous film panel 20B becomes counterclockwise circularly polarized light, which is the opposite rotation to the position 323, as shown in FIG. 6D.

The rotation direction of the circularly polarized light transmitted through the quarter-wave plate and the circularly polarized light when the reflected light is incident on the quarter-wave plate are the same. This is different from light reflection in the main display area.

In the reflected light that passes through the quarter-wave plate and reaches position 324, the phase of the Y-axis component parallel to the delay axis is delayed by 90° (π/2) from the phase of the X-axis component orthogonal to the delay axis since the direction of light travels is also opposite, the difference between the phase of the Y-axis component, which is the delay axis, and the phase of the X-axis component, which is orthogonal to the delay axis, returns to zero.

Figure 6E:
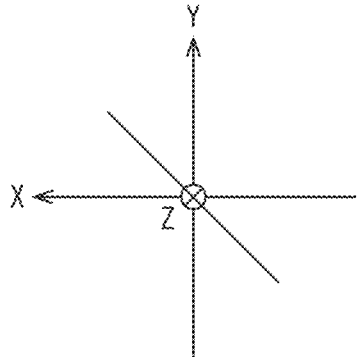
Figure 6F:
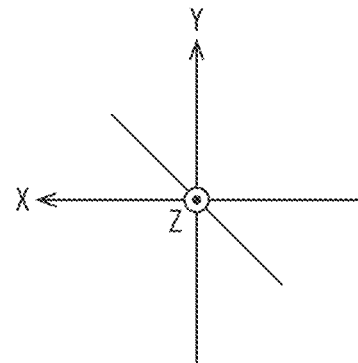

As shown in FIG. 6E, the position 324 is a position where the direction of the polarization plane is the same as that of the position 321 since the polarization plane of this linearly polarized light is parallel to the polarization axis of the linearly polarized plate 32, the reflected light passes through the linearly polarized plate 32, as shown in FIG. 6F, a position 325 is a position from which linearly polarized light is emitted.

If there is an optical path in which the light transmitted through the circularly polarizing plate 30 is reflected twice by the self-luminous film panel 20 and returns to the circularly polarizing plate 30, the circularly polarizing plate 30 cannot block the light. Even if it is external light that enters the circularly polarizing plate 30 and it is reflected on the surface or inside of the self-luminous film panel 20, therefore, the configuration of Comparative Example 1 cannot suppress external light reflection due to external light reflected in the sub-display area.

Figure 7A:
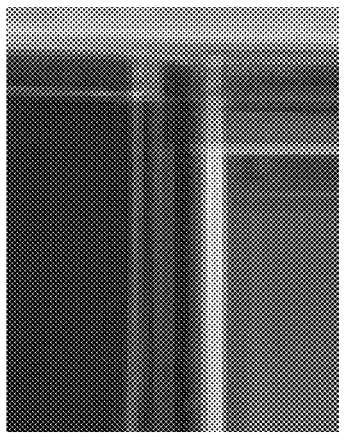
FIG. 7A is a photograph of the sub-display area in the self-luminous panel pertaining to Embodiment 1.
Figure 7B:
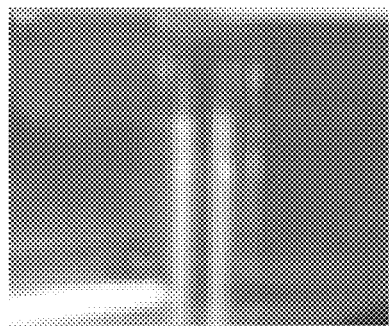
FIG. 7B is a photograph of the sub-display area in the self-luminous panel pertaining to Comparative Example 1.

The photograph in FIG. 7B is a photograph of the vicinity of the sub-display area of the display device according to Comparative Example 1.

As shown in FIG. 7B, it can be seen that in the configuration according to Comparative Example 1, the sub-display area shines white due to reflection of external light.

On the other hand, FIG. 5A is a schematic cross-sectional view showing an external light reflection path in the sub-display area in the first embodiment the configuration of the first embodiment is as follows. Each of the self-luminous panels 10A and 10B has a circularly polarizing plate, and the circularly polarizing plate is in close contact with the self-luminous film panel 20. As shown in FIG. 5(a), the optical path of external light transmitted through the circularly polarizing plate is reflected inside the self-luminous film panel 20A, then reflected again inside the self-luminous film panel 20B, and returns to the circularly polarizing plate.

The external light that has passed through the circularly polarizing plate passes through the circularly polarizing plate twice before being reflected inside the self-luminous film panel 20A and entering the self-luminous film panel 20B.

The optical path of external light that has passed through the circularly polarizing plate is the light that has passed through the circularly polarizing plate, the self-luminous film panel 20A, and the circularly polarizing plate is incident on the self-luminous panel 10B. At position 311 in the self-luminous panel 10A, external light transmitted through the linear polarizing plate 32A becomes linearly polarized light. At position 312 results in circularly polarized light. At position 313, the light is reflected inside the self-luminous film panel 20A and enters with the direction of rotation reversed. At position 314, the light becomes linearly polarized with the polarization axis and plane of polarization of the linearly polarizing plate 32A orthogonal to each other.

Similar to the main display area, almost no reflected light passes through the linear polarizing plate 32A.

At position 319, there is almost no transmitted light. In the self-luminous panel 10B, almost no reflected light passes through the linear polarizing plate 32A.

This is because at position 318 on the optical path passing through positions 315, 316, 317, and 318, the light becomes linearly polarized light in which the polarization plane and the polarization axis of the linear polarizing plate 32B are orthogonal to each other. The configuration according to the first embodiment also suppresses reflection of external light reflected by the sub-display area. The photograph in FIG. 7A is a photograph of the vicinity of the sub-display area in the display device according to the embodiment.

In the example of FIG. 7A, the self-emissive panel on the left side of the figure has the configuration according to the embodiment, and it can be confirmed that no reflection of external light occurs in the sub display area of the self-emissive panel on the left side of the figure.

4. Summary

As explained above, according to the display device pertaining to Embodiment 1, the reflection of external light in the sub-display area that exists at the seams of self-luminous panels is suppressed. Reflection of external light at the central portion of the self-luminous panel and the joint portion of the self-luminous panel is uniformly suppressed, this allows it to be used as a high-quality tiling panel.

Embodiment 2

1. Configuration of Circularly Polarizing Plate 30

In the display device pertaining to the first embodiment, the circularly polarizing plate 30 tightly covers at least the sub-display area of the self-luminous film panel 20, thereby suppressing reflection of external light in the sub-display area. In contrast, the sub-display area of Embodiment 2 further suppresses the phenomenon in which the display content of one self-luminous panel is reflected on the other self-luminous panel.

FIG. 8 is a schematic cross-sectional view showing a display image reflection path in the sub-display area. The path shown in this figure is a path in which the light emitted at the position 330 of the self-luminous panel 10A is reflected as external light on the surface of the self-luminous panel 10B.

In this case, the light emitted from the position 330 of the self-luminous panel 10A first passes through the quarter wavelength plate 31A.

The transmitted light from the self-luminous element does not become a specific polarized light, but becomes linearly polarized light when transmitted through the linear polarizing plate 32A, this is because the light from the self-luminous element is non-polarized. When the polarization axis of the linear polarizer 32A and the polarization axis of the linear polarizer 32B are not orthogonal. The light transmitted through the linearly polarizing plate 32B becomes linearly polarized light at a position 332 with the polarization axis of the linearly polarizing plate 32B serving as the plane of polarization. In particular, when the polarization axis of the linearly polarizing plate 32A and the polarizing axis of the linearly polarizing plate 32B are parallel, the light almost passes through the linearly polarizing plate 32B.

As explained in Embodiment 1, the position 333 becomes circularly polarized light, the position 334 becomes circularly polarized light which polarization plane is opposite to that of position 333, and the position 335 becomes linearly polarized light which polarization plane is orthogonal to that of position 332, at position 336 almost no light is emitted.

However, when the angle of incidence of light on the linear polarizing plate 32B or the quarter wavelength plate 31B is large, the linear polarizing plate 32B or the quarter wavelength plate 31B does not function sufficiently. At position 336, light is emitted with a certain degree of intensity. That is, in the sub-display area where the angle of incidence with respect to the circularly polarizing plate 30B is large, reflection of light from the self-luminous panel 10A cannot be sufficiently suppressed.

Figures 8A, 8B:
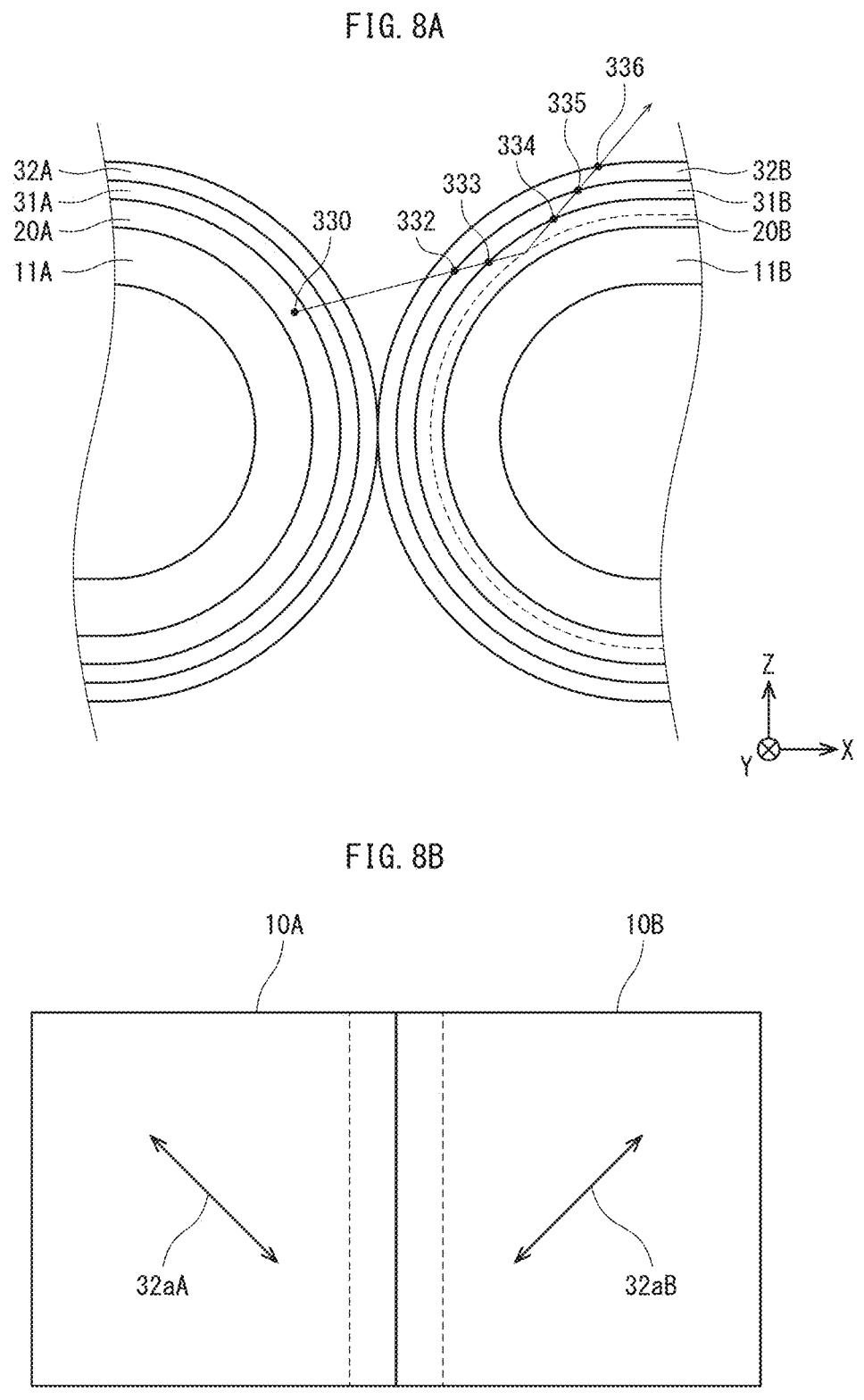

On the other hand, FIG. 8B is a diagram showing the configuration of the polarization axis of the linearly polarizing plate 32 of the circularly polarizing plate 30 pertaining to the second embodiment.

The configuration of the second embodiment is as follows. The polarization axis 32aA of the linear polarizer 32A in the main display area of the self-emission panel 10A is orthogonal to the polarization axis 32aB of the linear polarizer 32B in the main display area of the self-emission panel 10B.

In the sub-display area, the polarization axis of the linear polarizer 32A and the polarization axis of the linear polarizer 32B are orthogonal to each other.

Since the polarization axis of the linear polarizer 32A and the polarization axis of the linear polarizer 32B are substantially orthogonal to each other in the sub-display area, the light emitted from the position 330 of the self-luminous panel 10A has a large intensity when transmitted through the linear polarizer 32B and it makes decrease and weak at position 332. Therefore, in the sub-display area, it is possible to suppress a phenomenon which an image displayed on the sub-display area of an adjacent self-luminous panel is reflected.

Figure 10A:
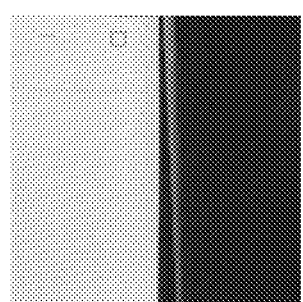
FIG. 10 is a photograph of the sub-display area of the self-luminous panel pertaining to Embodiment 2 or Comparative Example 2.
Figure 10B:
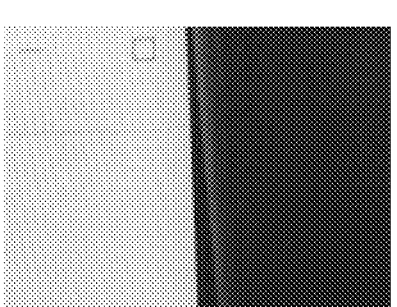
Figure 10C:
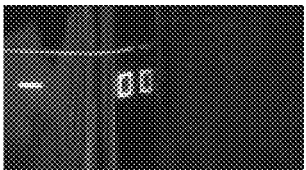
Figure 10D:
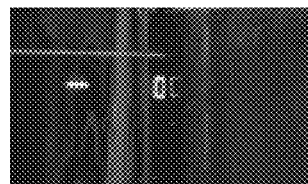

FIG. 10A and FIG. 10C are photographs taken of the state of the sub-display area in the display device pertaining to Comparative Example 2, and FIGS. 10B and 10D are photographs of the display according to Embodiment 2. This is a photograph taken of the state of the sub-display area in the device.

In Comparative Example 2, the polarization axis 32aA of the linear polarizing plate 32A in the main display area of the self-emitting panel 10A is parallel to the polarization axis 32aB of the linear polarizing plate 32B in the main display area of the self-emitting panel 10B.

Note that the display contents of the left self-luminous panel are the same in FIG. 10A and FIG. 10B, and the display contents of the left self-luminous panel are the same in FIG. 10C to FIG. 10D.

The sub-display area of the right self-luminous panel in Comparative Example 2 shines white due to reflection. In contrast, in the sub-display area pertaining to the second embodiment, reflection is suppressed.

Furthermore, when comparing FIG. 10C to FIG. 10D, the white squares (o) are strongly reflected in the sub-display area of Comparative Example 2. On the other hand, in the sub-display area pertaining to the second embodiment, although a white square (o) is reflected, the brightness is low.

Note that when the light emission intensity of the self-luminous panel is taken as 100%, the intensity of reflection in Comparative Example 2 was 45%, and the intensity of reflection in Embodiment 2 was 22%. That is, by adopting the configuration of Embodiment 2, it is possible to reduce the reflected light intensity by approximately half.

2. Summary

As described above, according to the display device pertaining to the second embodiment, it is possible to suppress the phenomenon in which the display content of one self-emissive panel is reflected on the other self-emissive panel at the joint of the self-emissive panels.

It is possible to suppress deterioration in display quality at the joint portion of the self-luminous panel, and it can be used as a high-quality tiling panel.

In addition to the configuration of Embodiment 1, Embodiment 2 has a configuration that suppresses the phenomenon in which the display content of one self-luminous panel is reflected on the other self-luminous panel.

However, a configuration may be adopted in which only to suppress the phenomenon in which the display content of one self-emitting panel is reflected on the other self-emitting panel. In this case, a quarter wavelength plate is not necessary, and a linear polarizing plate may be attached as in the second embodiment.

Modification 1

In Embodiment 1 and Embodiment 2, the self-emissive panels are arranged one-dimensionally in the display device, but the self-emissive panels may be arranged two-dimensionally.

In the display device according to Modification 1, the self-luminous panels are arranged two-dimensionally.

For example, each self-luminous panel shown in FIG. 18A has bent portions on all four sides. The self-luminous film panel shown in FIG. 18B has the shape of a developed view. For example, similar to Embodiment 1 or 2, in the display device shown in FIG. 18C, two adjacent self-emitting panels are arranged so that the sub display areas are in contact with each other.

Figures 9A, 9B:
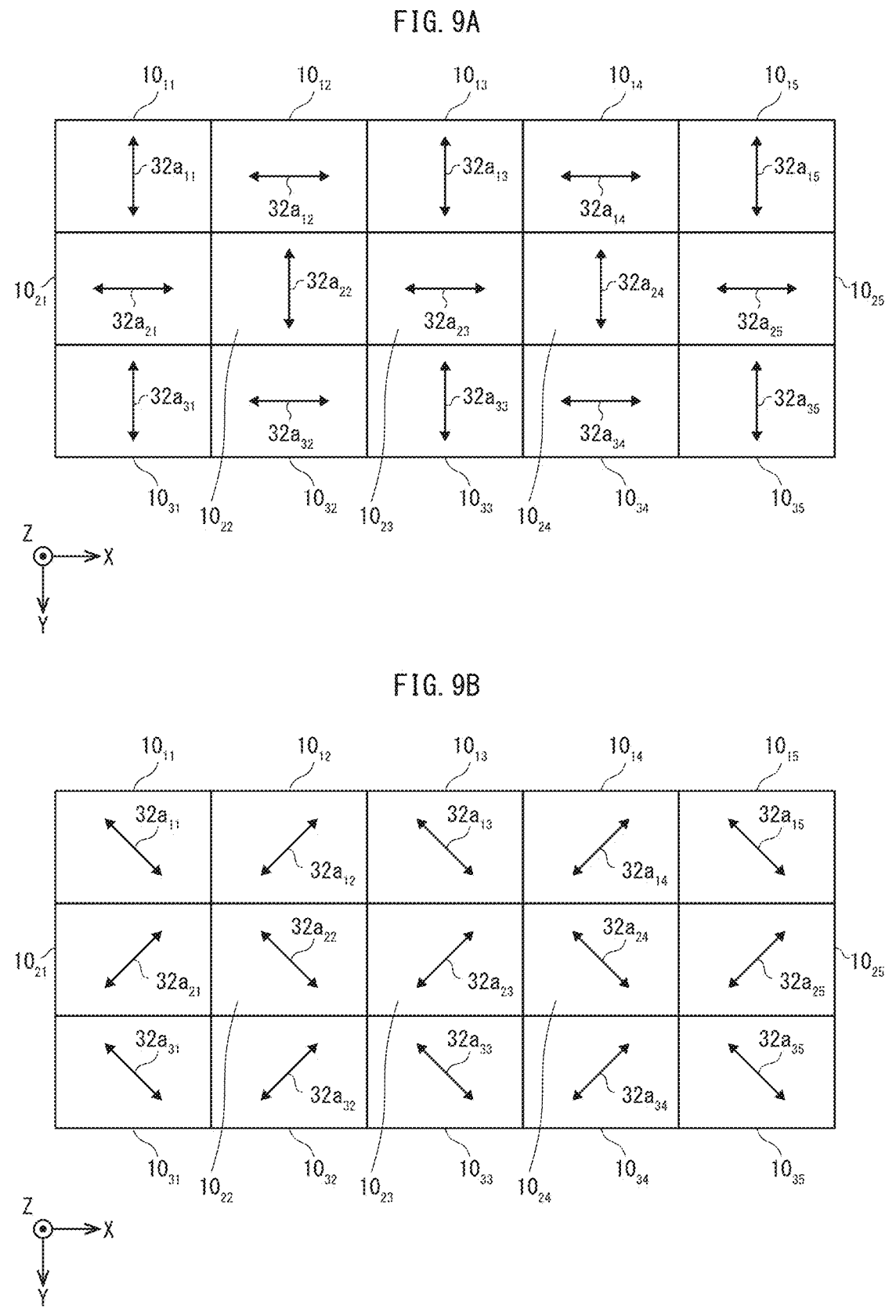

When obtaining the same effect as in the second embodiment in the first modification, the polarization axis of the linear polarizing plate in the main display area of the self-emitting panel is orthogonal to the polarization axis of the linear polarizing plate in the main display area of the self-emitting panel adjacent to the self-emitting panel. FIG. 9A is a schematic plan view showing the polarization axis of a linear polarizing plate when five self-emitting panels are arranged in the X direction and three self-emitting panels are arranged in the Y direction.

As shown in FIG. 9A, In self-luminous panel $10xy$, the polarization plane $32axy$ of the linear polarizing plate is orthogonal to the polarization axis $32a(x+1)y$ of the linear polarizing plate of the self-luminous panel $10(x+1)y$ adjacent to the x direction, and it is orthogonal to the polarization axis $32ax(y+1)$ of the linear polarizing plate of the light emitting panel $10x(y+1)$, therefore, the polarizing axis $32axy$ of the linear polarizing plate of the self-luminous panel $10xy$ coincides with the polarizing axis $32a(x+2)y$ of the linear polarizing plate of the self-luminous panel $10(x+2)y$ adjacent to the self-luminous panel $10(x+2)y$ separated by one in the x direction, and coincides with the polarization axis $32ax(y+2)$ of the linear polarizing plate of the self-luminous panel $10x(y+2)$ adjacent in the y direction with one space apart, Furthermore, it also coincides with the polarization axis $32a(x+1)(y+1)$ of the linear polarizing plate of the self-luminous panel $10(x+1)(y+1)$ adjacent in the diagonal direction.

That is, self-emissive panels which linear polarizing plates have the same polarization axes are lined up every other time so as to form a checkered pattern.

At this time, there are only two orientations of the polarization axis of the linear polarizer of the self-luminous panel are parallel to the polarization axis $32a11$ and orthogonal to the polarization axis $32a11$ Self-luminous panels which polarizing axes of linear polarizing plates are parallel to the polarizing axis $32a11$ and self-luminous panels which polarizing axes of linear polarizing plates are orthogonal to the polarizing axis $32a11$ are arranged alternately so as to be adjacent to each other, as a result, a display device using m×n (m and n are natural numbers) self-emitting panels can be formed.

Modification 2

In Modification 1, the polarization axes of the linearly polarizing plate were only explained as being in two directions orthogonal to each other, the arrangement may be such that the polarization axes of all the linear polarizing plates make an angle of 45° with respect to a specific direction.

FIG. 9B shows an arrangement which the polarization axes of all the linear polarizing plates make an angle of 45° with respect to the X direction (xz plane), glasses (hereinafter referred to as "polarized glasses") in which such a linearly polarizing plate is provided in the lens portion of the glasses can prevent uneven brightness when viewing a display on a display device.

Group A of self-luminous panels 1011, 1013, 1015, 1022, 1024, 1031, 1033, and 1035 have the same polarization axes of linear polarizing plates Group B of self-luminous panels 1012, 1014, 1021, 1023, 1025, 1032, and 1034 have linear polarizing plates with the same polarization axis. In group A and group B, the polarization axes of the linear polarizing plates are orthogonal.

Therefore, the arrangement of FIG. 9A exemplified in Modification 1, when the lenses of polarized glasses include a linear polarizing plate with the polarization axis in the X direction, Group B appears to have high brightness because the angle of the polarization axis between the linear polarizing plate included in the lens and the linear polarizing plate of the self-luminous panel is 0.

In group A, the linear polarizing plate included in the lens and the linear polarizing plate of the self-luminous panel have the same polarization axes, so the brightness looks low. When viewing a display on a display device through polarized glasses which lenses include a linear polarizing plate whose polarization axis is in the X direction, the checkerboard pattern appears to have uneven brightness.

On the other hand, in the case of the arrangement shown in FIG. 9B, consider a case where the lenses of polarized glasses include a linear polarizing plate which polarization axis is in the X direction In both groups A and B, the angle formed by the polarization axis of the linear polarizer included in the lens and the polarization axis of the linear polarizer in the self-luminous panel is the same, 45°. Therefore, when the lenses of polarized glasses include a linear polarizing plate which polarization axis is in the X direction, no unevenness in brightness is visible between Group A and Group B when viewing the display on the display device, that is, polarized glasses etc. A linear polarizing plate which polarization axis is in the X direction can suppress uneven brightness between self-emitting panels when a display is viewed on a display device.

The linear polarizing plate of the self-luminous panel was arranged so that the polarization axis of the linear polarizing plate made an angle of 45° with respect to the X direction.

The direction of the polarization axis of a linearly polarizing plate that may exist between the display device and the viewer is not limited to the X direction, but may be any arbitrary direction within the XY plane. It is sufficient that the polarization axes of the linear polarizing plates of all the self-luminous panels make an angle of 45° with respect to this arbitrary direction.

Further, the present invention is not limited to this. As long as the brightness unevenness between group A and group B is not noticeable the angle of the polarization axis of the linear polarizing plate of the self-luminous panel with respect to the direction may be deviated from 45° by about 100 for instance.

Embodiment 3

1 Detailed Configuration of Self-Luminous Panel 10

In this embodiment, the detailed configuration of the self-luminous panel 10 and its manufacturing method will be described.

The self-luminous panel 10 is formed by laminating a supporting member 11, a self-luminous film panel 20, and a circularly polarizing plate 30

Figure 11:
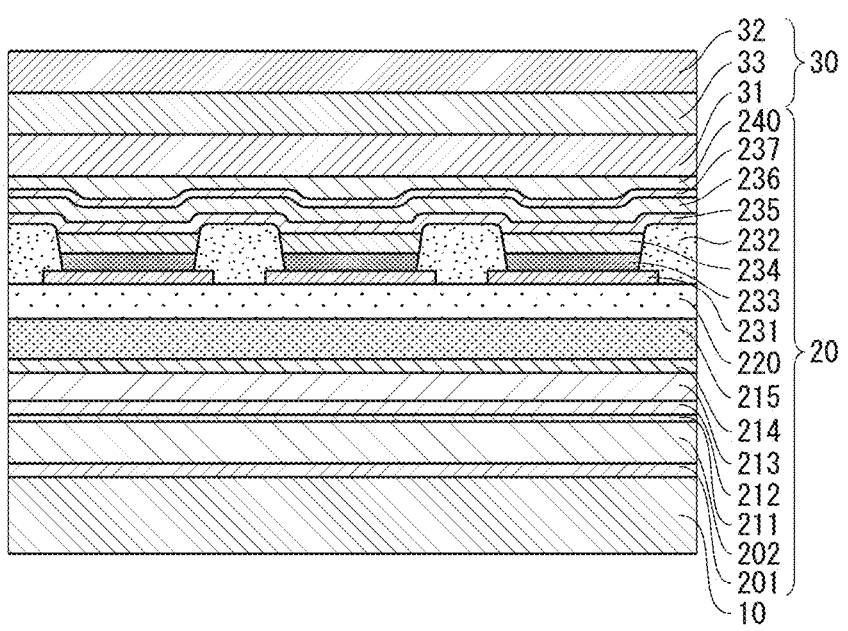
FIG. 11 is a detailed schematic cross-sectional view of the self-luminous panel 10 pertaining to the third embodiment.

FIG. 11 is a schematic cross-sectional view showing details of the self-luminous panel 10, and it is a partially enlarged view of FIG. 3.

The support member 11 is a material that supports the self-luminous film panel 20 and the circularly polarizing plate 30, and is made of metal, glass, resin, etc as described above.

The circularly polarizing plate 30 is made up of a quarter-wave plate 31, a half-wave plate 33, and a linear polarizing plate 32 stacked in this order. The quarter-wave plate 31 is made of, for example, a liquid crystal material arranged in a flexible resin. The thickness of the quarter wavelength plate 31 is, for example, 1 µm.

The half-wave plate 33 is made of, for example, a liquid crystal material arranged in a flexible resin, the film thickness of the half wavelength plate 33 is, for example, 2 µm.

The linear polarizing plate 32 is made of, for example, polyvinyl alcohol (PVA) dyed with iodine. the thickness of the linear polarizing plate 32 is, for example, 5 µm.

Although not shown in the figure, the following should be noted, an adhesive layer with a thickness of about 1 to 2 µm exists between the quarter wavelength plate 31 and the half wavelength plate 315, and between the half wavelength plate 315 and the linear polarizing plate 32.

Also, although not shown, it should be noted for example, an adhesive layer of 15 µm is present between the quarter-wave plate 31 and the self-luminous film panel 20.

For example, a protective layer made of an acrylic resin film about 20 to 60 µm thickness may be formed on the linear polarizing plate 32.
<Self-Luminous Film Panel>
The self-luminous film panel 20 includes, in order from the support member 11 side, a first adhesive layer 201, a first substrate layer 202, a second adhesive layer 211, a second substrate layer 212, a third substrate layer 213, a passivation layer 214, and a TFT layer 215, interlayer insulating layer 220, pixel electrode 231, partition 232, first functional layer 233, light emitting layer 234, second function.

A layer 235, a counter electrode 236, a sealing layer 237, a flattening layer 240, and a third adhesive layer 241 are laminated.

Among these, the pixel electrode 231, the first functional layer 233, the light emitting layer 234, the second functional layer 235, and the counter electrode 236 form an organic EL element that is a self-luminous element.

Further, the pixel electrode 231, the first functional layer 233, and the light emitting layer 234 are formed for each element.
<First Adhesive Layer>
The first adhesive layer 201 is an adhesive layer for attaching and fixing the self-luminous film panel 20 to the support member 11.

As the material of the first adhesive layer 201, a known adhesive can be used, such as an acrylic polymer, a rubber polymer, a polyester polymer, a urethane polymer, a polyether polymer, a silicone polymer, a polyamide polymer, examples include fluorine-based polymers.
<First Substrate Layer>
The first substrate layer 202 is a flexible film serving as the first layer of the flexible substrate, and is a backing substrate for maintaining the strength of the self-luminous film panel 20.

As the material of the first substrate layer 202, either a thermoplastic resin or a thermosetting resin may be used, and for example, polyethylene terephthalate (PET) can be used, for example, thermoplastic elastomers, epoxy resins, unsaturated polyesters, silicone resins, polyurethanes, etc., or copolymers and blends mainly made of these may be used.

Thermoplastic Elastomers Include Polyimide (PI) and Polyetherimide (PE)

I), polysulfone (PSu), polycarbonate (PC), polyethylene naphthalate (PEN), polybutylene terephthalate, styrene type, polyolefin type, and polyurethane type.

For example, the first substrate layer 202 may be a flexible substrate made of an inorganic material such as a glass thin film or a metal thin film, and it is not limited to resin the thickness of the first substrate layer 202 is, for example, 50 µm.
<Second Adhesive Layer>
The second adhesive layer 211 is an adhesive layer for attaching and fixing the first substrate layer 202 to the second substrate layer 212 and the third substrate layer 213. The first substrate layer 202 is a backing substrate, and the second substrate layer 212 and third substrate layer 213 are substrates used when manufacturing an organic EL display panel.

As the material for the first adhesive layer 211, a known adhesive can be used known adhesives include, for example, acrylic polymers, rubber polymers, polyester polymers, urethane polymers, polyether polymers, silicone polymers, polyamide polymers, fluorine polymers, and the thickness of the first adhesive layer 211 is, for example, 25 µm.
<Second Substrate Layer>
The second substrate layer 212 is a flexible film that becomes the second layer of the flexible substrate, and temporarily fixes the third substrate layer 213 to the holding substrate.

The third substrate layer 213 is a substrate used when manufacturing an organic EL display panel. For example, the second substrate layer 212 is made of polyimide (PI) and the thickness of the first substrate layer 212 is 10 µm.

<Third Substrate Layer>

The third substrate layer 213 is a flexible film serving as the third layer of the flexible substrate, and directly supports the TFT and the light emitting element.

As the material for the third substrate layer 213, either a thermoplastic resin or a thermosetting resin may be used, and for example, polyimide (PI) may be used.

For example, materials for the third substrate layer 213 include various thermoplastic elastomers such as polyether-imide, polysulfone, polycarbonate, polyethylene naphthalate, polybutylene terephthalate, styrene, polyolefin, and polyurethane, epoxy resin, and unsaturated polyester, silicone resin, polyurethane, etc., or copolymers and blends mainly composed of these may also be used and the thickness of the second substrate layer 213 is, for example, 10 μm.

<Passivation Layer>

The passivation layer 214 prevents entering of impurities from the third substrate layer 213 side and deteriorating the TFT layer and the light emitting element, the impurities include water and oxygen.

The material of the passivation layer 214 is, for example, silicon nitride (SiN) or silicon oxynitride (SiON).

<TFT Layer>

The TFT layer 215 is a circuit that drives each of the organic EL elements, and a drive circuit is formed for each pixel.

<Interlayer Insulation Layer>

The interlayer insulating layer 220 is a resin layer formed on the passivation layer 214 and the TFT layer 215, and flattens the step on the upper surface of the TFT layer 215. Examples of the material for the interlayer insulating layer 220 include positive photosensitive materials.

<Pixel Electrode>

The pixel electrode 231 includes a metal layer made of a light-reflective metal material and it is formed on the interlayer insulating layer 220.

The pixel electrode 231 is provided for each pixel and is electrically connected to the TFT layer 215 through a contact hole provided in the interlayer insulating layer 220.

In this embodiment, the pixel electrode 231 functions as an anode.

<Partition Wall>

The partition wall 232 is formed on the pixel electrode 231, exposes a part of the upper surface of the pixel electrode 231, and covers the surrounding area.

The partition walls 232 each have a truncated quadrangular pyramid shape or a similar shape, and the cross section is a trapezoid shape with a forward taper tapering upward or a bowl shape convex upward.

A region on the upper surface of the pixel electrode 231 that is not covered with the partition wall 232 (hereinafter referred to as an "opening") corresponds to a subpixel.

That is, the partition wall 832 has an opening 232a provided for each subpixel.

A portion of the partition wall 232 where the pixel electrode 231 is not formed is formed on the interlayer insulating layer 220. The bottom surface of the portion of the partition wall 232 where the pixel electrode 831 is not formed is in contact with the top surface of the interlayer insulating layer 220.

The partition wall 232 avoids contact between the ink for forming one subpixel and the ink for forming an adjacent subpixel, when forming the first functional layer 233 and/or the light emitting layer 234 by applying ink.

The partition wall 232 becomes a place where a vapor deposition mask is placed, when forming the first functional layer 233 and/or the light emitting layer 234 by a vapor deposition method.

Note that when at least one of the first functional layer 233 and the light emitting layer 234 is formed by a coating method, it is preferable that at least the top portion of the partition wall 232 has liquid repellency.

<First Functional Layer>

The first functional layer 233 promotes carrier flow from the pixel electrode 231 to the light emitting layer 234. In this embodiment, since the pixel electrode 231 is an anode, the first functional layer 233 preferably has hole injection and transport properties and/or electron blocking properties.

<Light-Emitting Layer>

The light emitting layer 234 is formed in the opening 232a and emits R, G, and B color light by recombining holes and electrons. As the material of the light emitting layer 234, known materials can be used.

Note that in this embodiment, since the light emitting element is an organic EL element, the light emitting layer 234 is made of an organic light emitting material.

However, the light emitting element layer of the light emitting layer 234 may be a quantum dot light emitting element layer using a material having a quantum dot light emitting effect.

<Second Functional Layer>

The second functional layer 235 promotes carrier injection from the counter electrode 236 toward the light emitting layer 234.

In this embodiment, since the counter electrode 236 is a cathode, the second functional layer 235 preferably has electron injection and transport properties and/or hole blocking properties.

<Counter Electrode>

The counter electrode 236 is formed on the second functional layer 235 in common to a plurality of pixels, and serves as a cathode in terms of an electric circuit.

The counter electrode 236 has both translucency and conductivity, and includes at least one of a metal layer formed of a metal material and a metal oxide layer formed of a metal oxide.

<Sealing Layer>

A sealing layer 237 is provided on the counter electrode 236.

The sealing layer 237 prevents from entering impurities from the circularly polarizing plate 30 side, and suppresses deterioration of the counter electrode 236 and the like due to impurities. The sealing layer 237 is formed using a transparent material such as silicon nitride (SiN) or silicon oxynitride (SiON). Furthermore, a sealing resin layer made of a resin material such as acrylic resin or epoxy resin may be provided on a layer formed using a material such as silicon nitride (SiN) or silicon oxynitride (SiON).

In this embodiment, since the organic EL element is a top emission type, the sealing layer 237 needs to be formed of a light-transmitting material.

<Plananzation Layer>

The flattening layer 240 is a resin layer for flattening the step on the sealing layer 237 of the organic EL element.

As the material for the planarization layer 240, any light-transmitting resin can be used. The thickness of the planarization layer 240 is, for example, 15 μm.

Display Device Manufacturing Method

The method for manufacturing the display device will be described below. The method for manufacturing a display device is an example of a method for manufacturing a tiling display, and is one form of an embodiment.

FIG. 13 to FIG. 17 are schematic cross-sectional views showing states at each step in manufacturing the display device 300.

Figure 12:
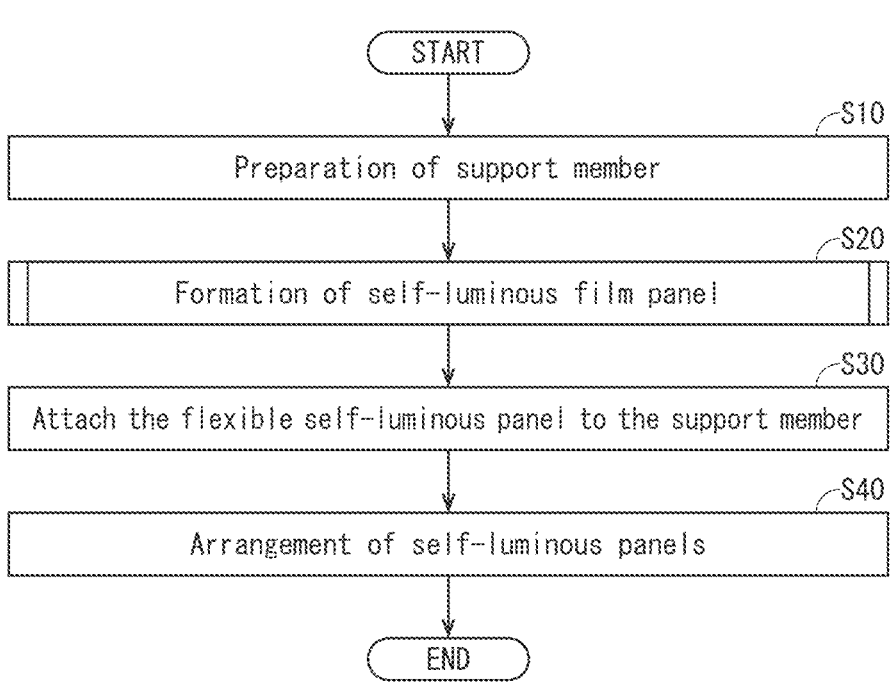
FIG. 12 is a flowchart showing the manufacturing process of the display device pertaining to the third embodiment.

Furthermore, FIG. 12 and FIG. 13 are flowcharts showing a method for manufacturing the display device 300.

(1) Preparation of Support Member 11

First, the material of the support member 11 is molded into the shape of the self-luminous panel 10 (stepS10).

(2) Formation of Self-Luminous Film Panel 20

Next, a self-luminous film panel 20 is formed (step S20). FIG. 13 is a flowchart showing a method for manufacturing the self-luminous film panel 20.

(i) Formation of Flexible Substrate

Figure 14A:
FIG. 14A is a partial cross-sectional view showing a state in which a second substrate layer and a third substrate layer are formed on a support substrate.

First, as shown in FIG. 14A, a second substrate layer 212 is formed on the holding substrate 100, and a third substrate layer 213 is further formed on the second substrate layer 212. For the holding substrate 100, for example, a rigid substrate such as a glass substrate can be used.

Note that when laser light is used in step S330, which will be described later, the holding substrate 100 is preferably a light-transmitting substrate.

For example the second substrate layer 212 is formed, by applying the material of the second substrate layer 212 by a spin coating method or the like, and drying (baking) the material.

Similarly, the third substrate layer 213 is formed by applying the material of the third substrate layer 213 by spin coating or the like, and drying (baking) the material.

Next, a passivation layer 214 is formed on the third substrate layer 213.

The passivation layer 214 is uniformly formed on the third substrate layer 213 by for example, a CVD method or a sputtering method.

Figure 14B:
FIG. 14B is a partial cross-sectional view showing a state in which a passivation layer is formed on the third substrate layer.

As a result, a flexible substrate is formed (FIG. 14B, step S210)

(ii) Formation of TFT Layer 215

Next, a TFT layer 215 is formed on the passivation layer 214 (step S220).

The TFT layer 215 can be formed by a known TFT manufacturing method.

(iii) Formation of Interlayer Insulating Layer 220

Figure 14C:
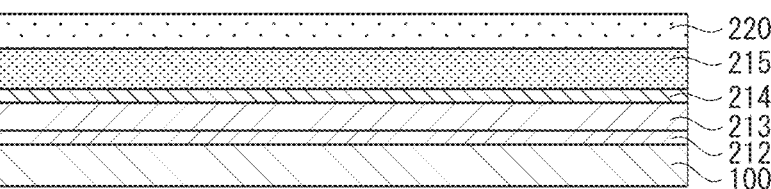
FIG. 14C is a partial cross-sectional view showing a state in which a TFT layer and an interlayer insulating layer are formed on a passivation layer.

Next, an interlayer insulating layer 220 is formed on the TFT layer 215 (FIG. 14C, step S230).

The interlayer insulating layer 220 can be formed in layers by using, for example, a plasma CVD method, a sputtering method, or the like.

Next, dry etching is performed on a portion of the interlayer insulating layer 220 above the source electrode of the TFT layer 215, this creates a contact hole. The contact hole is formed so that the bottom surface of the source electrode is exposed at the bottom of the contact hole.

Next, a connection electrode layer is formed along the inner wall of the contact hole. A part of the upper part of the connection electrode layer is disposed on the interlayer insulating layer 220. The connection electrode layer can be formed by using, for example, a sputtering method, and after forming a metal film, patterning is performed by using a photolithography method and a wet etching method.

(iv) Formation of Pixel Electrode 231

Figure 14D:
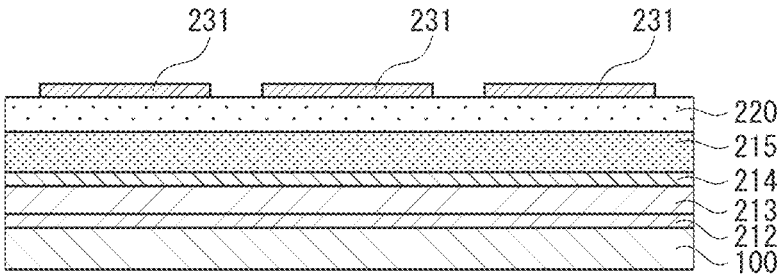
FIG. 14D shows a part where the pixel electrode is formed on the interlayer insulating layer.

Next, as shown in FIG. 14D, a pixel electrode 231 is formed on the interlayer insulating layer 220 (step S240). The formation of the pixel electrode 231 is as follows.

For example, a material for the pixel electrode 231 is uniformly formed on the interlayer insulating layer 220 by using a vacuum evaporation method or a sputtering method.

After that, patterning is performed by photolithography and etching.

(v) Formation of Partition Wall 232

Next, as shown in FIG. 1A, A partition wall 232 is formed in the gap between the pixel electrodes 231 on the interlayer insulating layer 220 (step S250).

The formation of the partition wall 232 is as follows 1), 2).

1) Appling a solution of phenolic resin, which is a photosensitive material, dissolved in a solvent is uniformly applied using a spin coating method.

2) Patterning by pattern exposure and development.

(vi) Formation of First Functional Layer 233

Figure 15A:
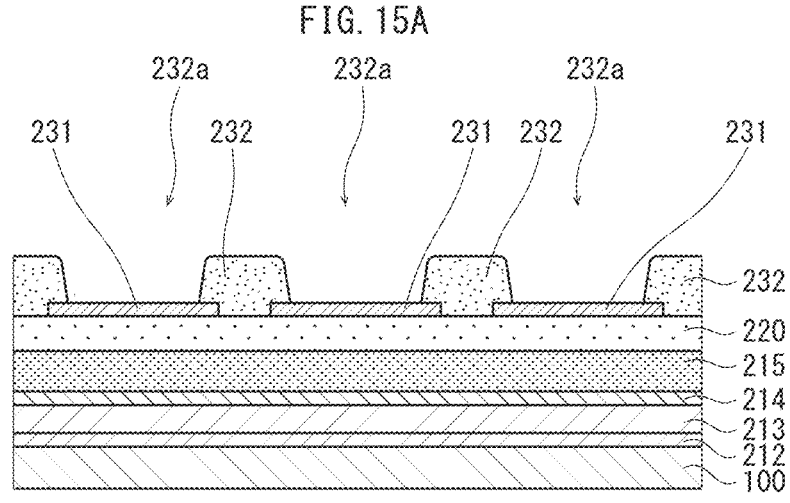
FIG. 15A is a partial cross-sectional view showing a state in which a partition wall is formed on a pixel electrode and an interlayer insulating layer.
Figure 15B:
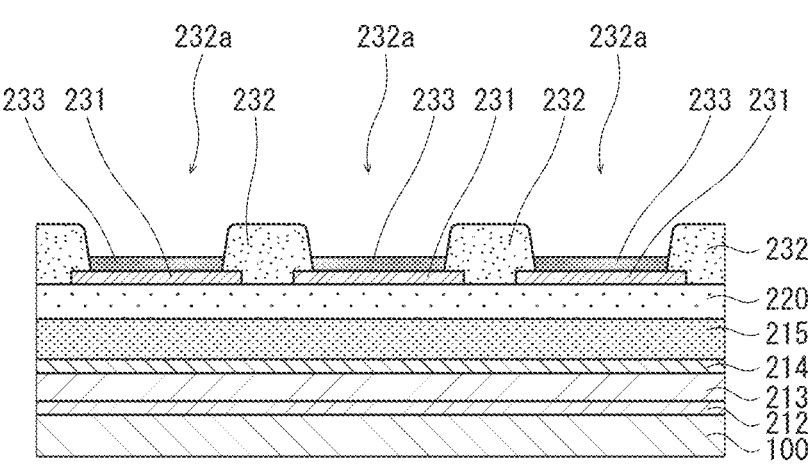
FIG. 15B is a partial cross-sectional view showing a state in which the first functional layer is formed within the opening of the partition wall.

Next, as shown in FIG. 15B, the first functional layer 233 is formed on the pixel electrode 231 existing in the opening 232a between the partition walls 232 (step S260).

For example, forming of first functional layer 233 is performed by discharging and applying ink containing the material of the first functional layer 233 from a nozzle of an inkjet head, and baking (drying) the ink.

Alternatively, the forming of the first functional layer 233 performed by placing a vapor deposition mask corresponding to the opening 232a on the partition wall 232.

The material of the first functional layer 233 may be formed by a vacuum evaporation method, a PVD method, a CVD method, or the like.

Note that when the first functional layer 233 has a multilayer structure, all layers may be formed by a coating method, all layers may be formed by vapor deposition.

Alternatively, forming of some layers performed by a coating method, and the remaining layers may be formed by a vapor deposition method.

(vii) Formation of Light Emitting Layer 234

Figure 15C:
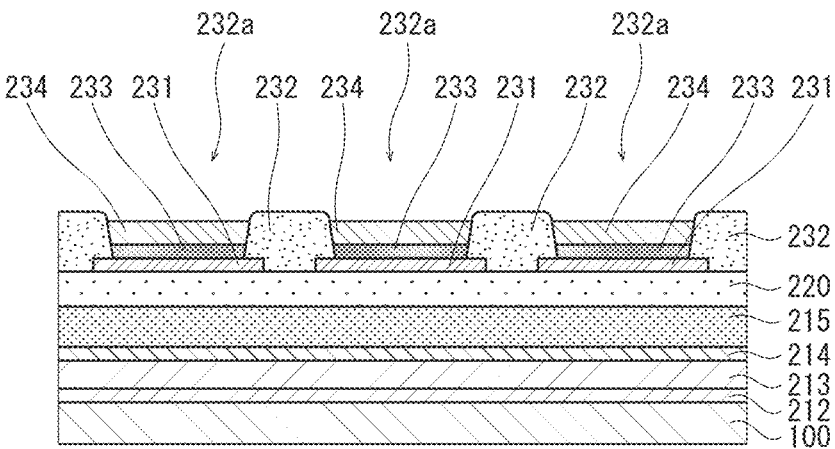
FIG. 15C is a partial cross-sectional view showing a state in which a light emitting layer is formed on the first functional layer.

Next, as shown in FIG. 15C, a light emitting layer 234 is formed on the first functional layer 233 existing in the opening 232a between the partition walls232 (step S270).

Formation of the light-emitting layer 234 is performed through the following process. For example, ink containing the material for the light emitting layer 234 is applied by being discharged from a nozzle of an inkjet head and perform firing (drying).

Alternatively, the light emitting layer 234 is formed by the following process, for example, a vapor deposition mask corresponding to the opening 232a is placed on the partition wall 232. A material for the light emitting layer 234 is formed by vacuum evaporation, PVD, CVD, etc.

(viii) Deposition of Second Functional Layer 235

Figure 16A:
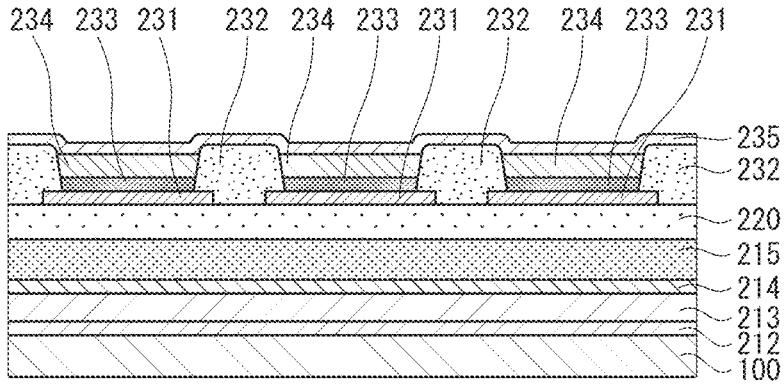
FIG. 16A is a partial cross-sectional view showing a state in which the second functional layer is formed on the partition wall and the light emitting layer.

Next, as shown in FIG. 16A, a second functional layer 235 is formed on the light emitting layer 234 and the partition wall 232 (step S280). The second functional layer 235 is formed by for example, depositing the material of the second functional layer 235 by a vacuum evaporation method, a PVD method, a CVD method, or the like.

(ix) Film Formation of Counter Electrode 236

Figure 16B:
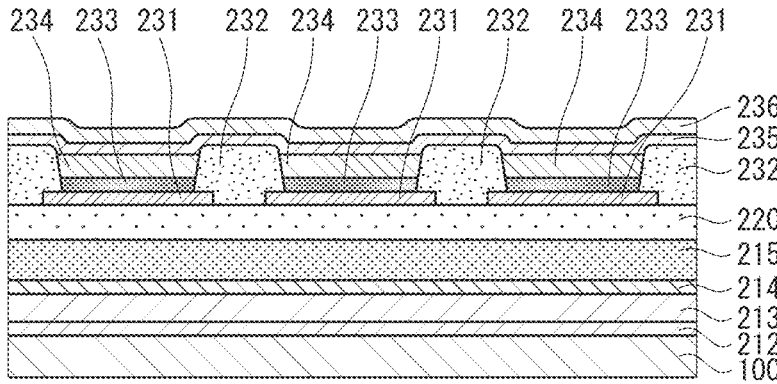
FIG. 16B is a partial cross-sectional view showing a state in which a counter electrode is formed on the second functional layer.

Next, as shown in FIG. 16B, a counter electrode 236 is formed on the second functional layer 235 (step S290).

The counter electrode 236 is formed, by for example, depositing the material of the counter electrode 236 into a film using a vacuum evaporation method, a sputtering method, or the like.

(x) Formation of Sealing Layer 237

Figure 16C:
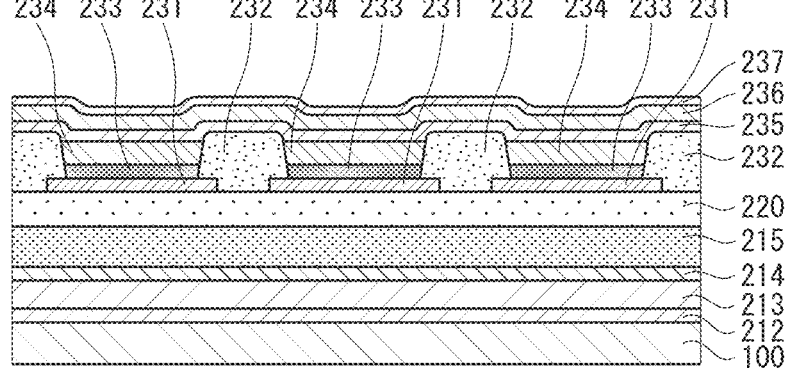
FIG. 16C is a partial cross-sectional view showing a sealing layer formed on the counter electrode.

Next, as shown in FIG. 16C, a sealing layer 237 is formed on the counter electrode 236 (step S310). The sealing layer 237 is formed by for example, depositing the material of the sealing layer 237 by a CVD method, a sputtering method, or the like.

(xi) Attaching Circularly Polarizing Plate 30

Figure 17A:
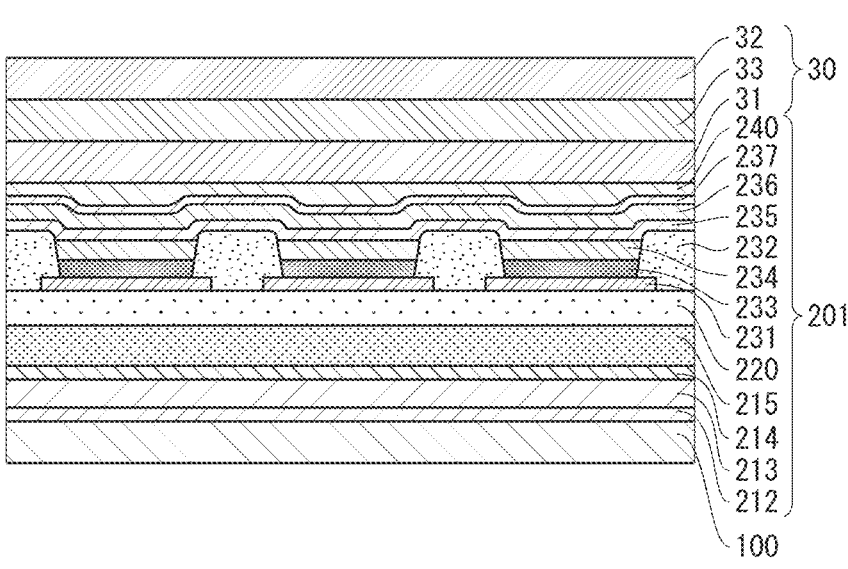
FIG. 17A is a partial cross-sectional view showing a state in which a flattening layer is formed on the sealing layer and a circularly polarizing plate is attached.

Next, a circularly polarizing plate 30 is attached (FIG. 17A, step S320).

In particular, a planarization layer 240 is formed on the sealing layer 237.

The planarization layer 240 is formed, for example, first applying the material of the planarization layer 240 onto the sealing layer 237 by using a dispenser or the like.

Second, attaching the half wavelength plate 315 to the linear polarizing plate 32 via adhesive. Furthermore, a quarter wavelength plate 31 is attached to the half wavelength plate 315 with an adhesive to form a circularly polarizing plate 30

Third, attaching the circularly polarizing plate 30 to the quarter-wave plate 31 on the flattening layer 240 by applying an adhesive.

Note that the circularly polarizing plate 30 is pasted according to the following 1), 2)

1) An appling adhesive to a previously completed circularly polarizing plate 30 and attached to the flattening layer 240

2) Prepare a completed circularly polarizing plate 30 with a quarter wavelength plate 31 coated with adhesive, attaching the prepared completed circularly polarizing plate 30 to the flattening layer 240.

(xii) Peeling the Flexible Substrate from the Support Substrate Next, the holding substrate 100 above the second substrate layer 212 is peeled off (step S330).

Peeling off is performed, by for example, irradiating the interface between the holding substrate 10 and the second substrate layer 212 with laser light (3) Attach the Flexible Self-Luminous Panel to the Support Member.

Returning to FIG. 12, the explanation will be continued.

Figure 17B:
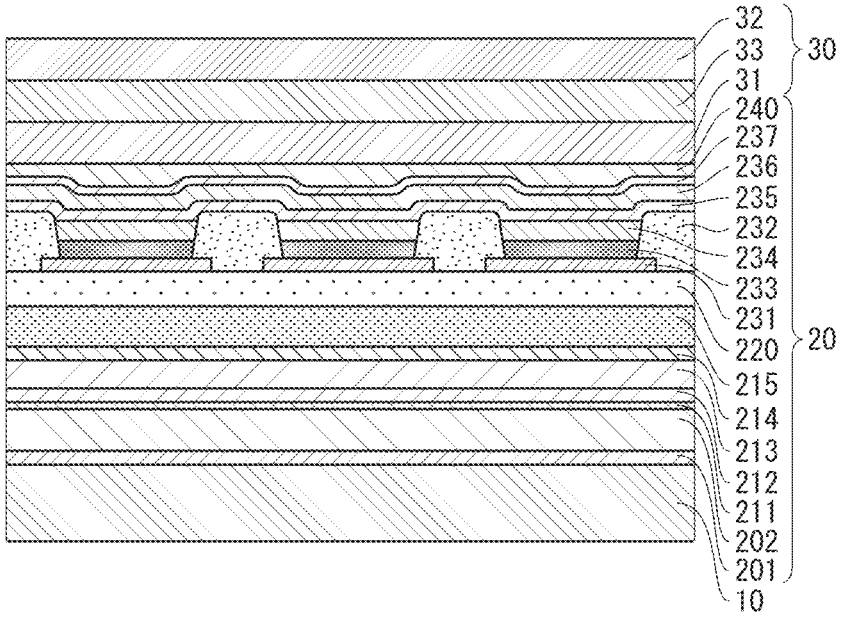
FIG. 17B is a partial cross-sectional view showing a state in which the first substrate layer is attached via the second adhesive layer and then attached to the support member via the first adhesive layer.

Next, the flexible self-luminous panel is attached to the support member (FIG. 17B, step S30). Specifically, at first, applying a second adhesive layer 211 on the first substrate laver 20. It is attached to the underside of the second substrate layer 212 to reinforce the flexible substrate. Next, a first adhesive layer 201 is applied to the support member 10, and a first substrate layer 202 is attached. Thereby, the self-luminous panel 10 is completed.

(4) Arrangement of Self-Luminous Panels

Finally, the edges of the sub-display areas of the two self-luminous panels 10 are brought into contact with each other and completes the tiling display (step S40).

Other Modifications of the Embodiment (1) In the above embodiment, the self-emissive panel 10 is bent at R=5 mm at the portion that contacts another self-emissive panel 10, and has a J-shaped cross section. The structure of the bent portion is not limited to this. For example, R may be any value such as 3 mm or 7 mm.

Figure 19A:
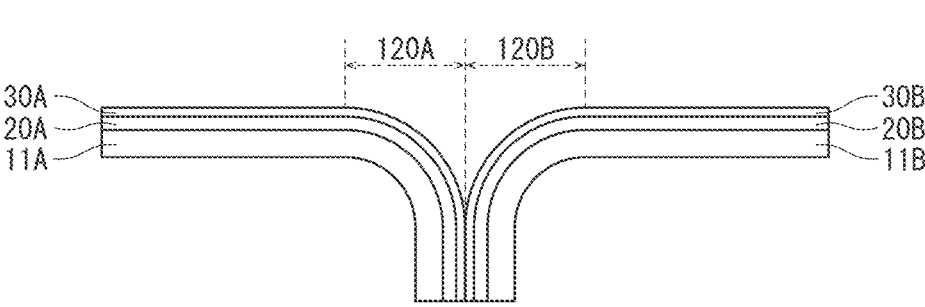
FIG. 19 is a schematic cross-sectional view showing the configuration of a self-luminous panel pertaining to a modified example.

Further, the structure of the bent portion is not limited to this. For example, as shown in FIG. 19A, the connection region 130 may be planar.

Figure 19B:
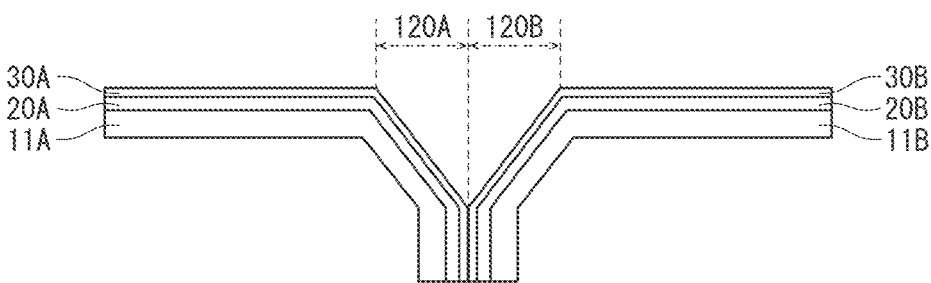
Figure 19C:
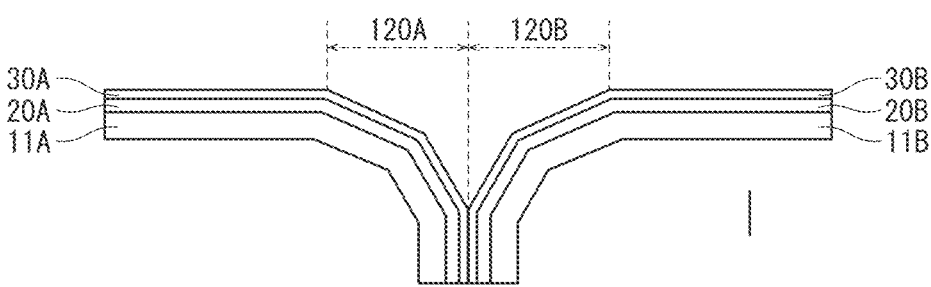

Alternatively, as shown in FIG. 19B and FIG. 19B, the bent portion may not be a curved surface but may be bent.

(2) In the above embodiment, the self-luminous panels 10 are in contact with other self-luminous panels 10, but adjacent self-luminous panels do not necessarily need to be in contact with each other.

For example, as shown in FIG. 20A, they may be separated by a small distanced.

Here, the minute separation distance d may be, for example, 10% or less of the width of the entire self-luminous panel, 5% of the width of the main display area 110, or the width of the sub display area 120. It may be less than or equal to.

The separation distance d may be 10' or less as a viewing angle, for example, 3 mm or less for a viewing distance of 1 m.

Note that when the sub-display area 120 is bent into a cylindrical shape, the separation distance d is preferably 0.93R or less, the separation distance d is required for light emitted from the edge of a certain sub-display area to be reflected by an adjacent sub-display area and emitted at an emission angle of 30° is 0.93R.

If the separation distance d exceeds 0.93R, a portion of the emitted light will not be reflected, and the effect of suppressing reflection will be reduced.

Show in FIG. 20B a path 180 is an optical path when the separation distance d is 0.93, and its emitting light makes an angle of 30° with respect to normal line 160.

The angle of 30° is the angle formed by the reflected light when the light emitted from the edge of the sub-display area is reflected symmetrically with respect to the normal line 150 orthogonal to the tangent 140 of the incident position of the adjacent sub-display area.

The reflected light that follows the path 180 is the light that is emitted in the sub-display area and is reflected on the adjacent sub-display area and it is visually recognized, and represents limited reflection From the relationship shown in the Figure, $$(d+R-R\sqrt{2})\tan 30°=R\sqrt{2}$$

is guided and further d=0.93R is derived (3) In the above embodiment, the main display area 110 is a flat area and the sub display area 120 is a curved area, but the present invention is not limited to this.

For example, the entire sub-display area 120 does not need to be curved, the peripheral portion of the self-luminous panel 10 may be any area including a bent portion.

Furthermore, the main display area 110 does not need to be flat. The main display area 110 may have a curved shape such as a cylindrical side surface shape or a spherical surface shape, or may include a bent portion such as a polyhedral surface shape.

The self-luminous panel 10 may be arranged such that the display area has a cylindrical side surface shape, a spherical surface shape, or a polyhedral surface shape Furthermore, adjacent sub-display areas 120 do not need to be in continuous contact with each other. As long as the requirement that the display areas are approximately continuous is satisfied, gaps may be provided between the sub-display areas 120.

Figure 19D:
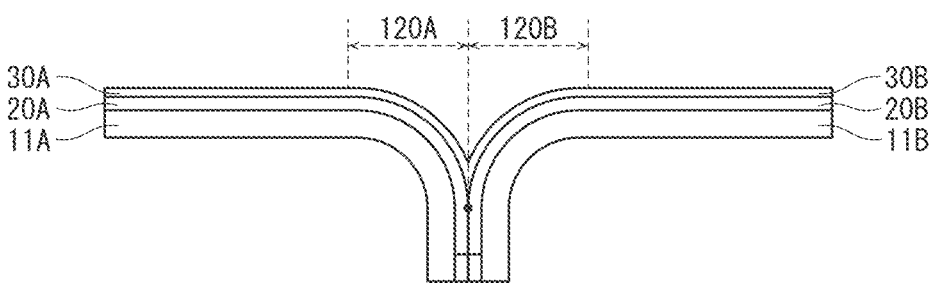

(4) In the above embodiment, the circularly polarizing plate 30 covers the entire area of the self-luminous film panel 20 in the self-luminous panel 10, but the present invention is not limited to this, for example, the circularly polarizing plate may cover only the sub display area 120, for example, as shown in FIG. 19D.

One circularly polarizing plate 30 may span over a plurality of self-luminous film panels 20, and the circularly polarizing plate 30 may also be in close contact with the self-luminous film panels 20 in the sub-display area 120.

(5) In the above embodiment, the circularly polarizing plate 30 is a laminated structure in which a quarter wavelength plate 31 and a linear polarizing plate 32 are laminated on the self-luminous film panel 20 side, or a laminated structure in which a quarter wavelength plate 31, linear polarizing plate 32, half wavelength plate 33 on the self-luminous film panel 20 side, however it is not limited to this. The circularly polarizing plate 30 which the linearly polarizing plate 32 is provided thereon, the linearly polarizing plate 32 which has a hard coat layer or an antireflection layer (AR layer).

Furthermore, the structure of the circularly polarizing plate 30 is not limited to the combination of a quarter wavelength plate, the linearly polarizing plate which has another configuration that reflect circularly polarized light to perform an antireflection function.

Other configurations include any combination of a wave plate and a linear polarizer that converts linearly polarized light to circularly polarized light.

(6) In the above embodiment, the display device has two self-emitting panels 10, but the present invention is not limited to this for example a display device may be configured by arranging three or more self-luminous panels in a row. Among the three or more self-luminous panels, the one located in the center has bent portions at both edges.

(7) In the above embodiment, the self-luminous panel 10 has a structure in which the self-luminous film panel 20 is attached onto the support member 11.

However, it is not limited to this. The light emitting element may be placed directly on a substrate having the same shape as the support member.

Or, for example, the substrate of the self-luminous panel 10 may be a thin film of glass or metal. The self-luminous panel 10 is constructed by forming a light emitting element on a substrate made of a thin film of glass or metal, attaching a circularly polarizing plate on it, and bending the plate.

(8) In the above embodiment, the display device 300 is configured to include a plurality of self-luminous panels 10 having substantially the same configuration, it is not limited to this, as long as the configuration of the sub-display area is as shown in the embodiment, a tiling display may be configured by using self-emitting panels with different configurations. Tiling displays do not have to be flat, the self-luminous panels 10 may be arranged to form a curved surface or a polyhedral shape.

(9) In the above-mentioned embodiment, "Claim 5" is adopted The polarization axis of the linear polarizing plate in one sub-display area of two adjacent self-luminous panels was orthogonal to the polarization axis of the linear polarizing plate in the other sub-display area.

Furthermore, "Claim 6" is constituted

Here, "orthogonal" refers to the angle formed by two polarization axes or two directions, that is, when the angle between the polarization axes of linear polarizers of adjacent self-luminous panels is not limited 90° although the angle between the polarization axes deviates from 90°, this includes a case where the substantially equivalent effects is equivalent to that of a tiling panel in which the angle between the polarization axes is 90°

Substantially equivalent effects indicate that deterioration in display quality at the joint portion of the self-luminous panel is suppressed, the display quality deterioration is caused by light reflection.

The suppression refers to the fact that even if the joint portion of the self-luminous panel includes a white light part in the joint portion is not noticeable, the white light part are caused by reflections of external light and reflections from adjacent self-luminous lights.

The angle between the polarization axes of the linear polarizers of adjacent self-luminous panels may deviate from 90° by for example, about 10°, 15°, or 20°. The value of angular deviation requires that the white part become less noticeable. The allowable value of angular deviation differs depending on the type of self-luminous panel.

(10) In the above embodiment, the self-luminous panel 10 includes an organic EL element or a QLED element that is a self-luminous element.

In the self-luminous panel 10, the display element does not necessarily have to be a self-luminous element, for example, it may be a panel that combines a liquid crystal display element, a backlight, an optical waveguide, or a light reflection plate.

(11) The display panel and the method for manufacturing the display panel according to the present disclosure have been described above based on the embodiments and modifications.

The present invention is not limited to the embodiments and modifications described above forms and modifications obtained by modifying the above embodiments and modifications can be imagined by a person skilled in the art.

The present invention also includes forms realized by arbitrarily combining the components and functions in the embodiments and modified examples, the combinations are limited to the extent that they do not depart from the spirit of the present invention.

INDUSTRIAL APPLICABILITY

In a connected portion of a tiling display that connects a plurality of display panels to form one display device, deterioration in the quality of image due to light reflection is suppressed.

REFERENCE SIGNS LIST

10 Self-luminous panel
11 Support member
20 Self-luminous film panel
30 Circularly polarizing plate
31 Quarter wave plate
32 Linear polarizing plate
130 Display area
110 Main display area
120 Sub display area
300 Display device

The invention claimed is:

1. A display panel comprising:
one or more pairs of self-luminous panels, each said pair of self-luminous panels including a first self-luminous panel and a second self-luminous panels,
a display area on a front side of each of the self-luminous panels includes a main display area and a sub-display area;
each of the sub-display areas has a portion that is connected to the main display area and that bends toward a back side of the self-luminous panel opposite the front side of the self-luminous panel, wherein each said pair of self-luminous panels is arranged such that their sub-display areas are adjacent to each other and separate the main display area of the first self-luminous panel from the main display area of the second self-luminous panel in a front plan view of the tiling panel; and
a circularly polarizer on at least the sub-display area of the first self-luminous panel and at least the sub-display area of the second self-luminous panel and including a quarter wavelength layer and a linear polarizing layer, wherein a polarization axis of the linear polarizing layer of the circularly polarizer in the sub-display area of the first self-luminous panel is orthogonal to a polarization axis of the linear polarizing layer of the circularly polarizer in the sub-display area of the second self-luminous panel.

2. The display panel of claim 1, wherein for each of the first and second self-luminous panels the circularly polarizer extends from the sub-display area to the main display area.

3. The display panel of claim 2, wherein for each of the first and second self-luminous panels the circularly polarizer is formed over the entire main display area.

4. The display panel of claim 1,
wherein the circularly polarizer is composed of an upper layer and a lower layer, wherein the lower layer has a quarter wavelength plate as the quarter wavelength layer of each of the first self-luminous panel and the second self-luminous panel, and
wherein the upper layer has a linear polarizing plate as the linear polarizing layer of each of the first self-luminous panel and the second self-luminous panel.

5. The display panel of claim 1, further comprising more than two of said pairs of the self-luminous panels,
wherein the self-luminous panels are arranged in rows along a first direction and columns along a second direction orthogonal to the first direction,
wherein the first self-luminous panels and the second self-luminous panels are arranged alternately in the first direction for all of the rows and columns starting from an initial self-luminous panel,
wherein the first self-luminous panels and the second self-luminous panels are arranged alternately in the second direction for all of the rows and columns starting from the initial self-luminous panel,
wherein the linear polarizing layer of the circularly polarizer of each of the first self-luminous panels has a linear polarizing plate in which the polarization axis is in the first direction, and
wherein the linear polarizing layer of the circularly polarizer of each of the second self-luminous panel has a linear polarizing plate in which the polarization axis is in the second direction.

6. The display panel of claim 1, further comprising more than two of said pairs of the self-luminous panels
wherein the self-luminous panels are arranged in rows along a first direction and columns along a second direction orthogonal to the first direction,
wherein the first self-luminous panels and the second self-luminous panels are arranged alternately in the first direction for all of the rows and columns starting from an initial self-luminous panel,
wherein the first self-luminous panels and the second self-luminous panels are arranged alternately in the second direction for all of the rows and columns starting from the initial self-luminous panel,
wherein the linear polarizing layer of the circularly polarizer of each of the first self-luminous panels has a linear polarizing plate in which the polarization axis is in a third direction,
wherein the linear polarizing layer of the circularly polarizer of each of the second self-luminous panel has a linear polarizing plate in which the polarization axis is in a fourth direction opposite to the third direction, and
wherein a 45-degree angle is between the first direction and the third direction.

7. The display panel of claim 1,
wherein each of the first and second self-luminous panels includes:
a support member,
a flexible substrate on the support member, and
the circularly polarizer as a layer attached to the flexible substrate, and
wherein the flexible substrate has a plurality of light emitting elements.

8. The display panel of claim 1, further comprising an organic EL element as a light emitting element.

9. The display panel of claim 1, wherein the circularly polarizer is in an optical path of an incident light and/or an emitting light of the sub-display area for each of self-luminous panels.

10. The display panel of claim 1, wherein the circularly polarizer includes:
a first circularly polarizer on at least the sub-display area of the first self-luminous panel, and
a second circularly polarizer, distinct and different from the first circularly polarizer, on at least the sub-display area of the second self-luminous panel.

11. The display panel of claim 1, wherein the main display areas of each of the self-luminous panels are flat.

12. A display panel comprising:
a plurality of self-luminous panels, including a first self-luminous panel and a second self-luminous panel, a display area on a front side of each of the self-luminous panels includes a main display area and a sub-display area,
each of the sub-display areas has a portion that is connected to the main display area and that is curved and bends toward a back side of the self-luminous panel opposite the front side of the self-luminous panel, wherein the first and second self-luminous panels are arranged such that their sub-display areas are adjacent to each other;
a first circularly polarizer is on at least the sub-display area of the first self-luminous panel and includes a first quarter wavelength layer and a first linear polarizing layer; and
a second circularly polarizer, different from the first circularly polarizer, is on at least the sub-display area of the second self-luminous panel and includes a second quarter wavelength layer and a second linear polarizing layer,
wherein a polarization axis of the first linear polarizing layer of the circularly polarizer in the sub-display area of the first self-luminous panel is orthogonal to a polarization axis of the linear polarizing layer of the circularly polarizer in the sub-display area of the second self-luminous panel.

13. A self-luminous panel comprising;
a plurality of self-luminous panels, including a first self-luminous panel and a second self-luminous panel, a display area on a front side of each of the self-luminous panels includes a main display area and a sub-display area;
each of the sub-display areas has a portion that is connected to the main display area and that is curved and bends toward a back side of the self-luminous panel opposite the front side of the self-luminous panel, wherein the first and second self-luminous panels are arranged such that their sub-display areas are adjacent to each other; and
a circularly polarizing layer on the main display area and the sub-display area of the first self-luminous panel and on the main display area and the sub-display area of the second self-luminous panel, the circularly polarizing layer including a quarter wavelength layer and a linear polarizing layer;

wherein a polarization axis of the circularly polarizing layer on the first self-luminous panel is orthogonal to a polarization axis of the circularly polarizing layer on the second self-luminous panel.

14. The self-luminous panel of claim 13, all sides constituting an outer periphery of the self-luminous panel in a plan view have the sub-display area.

15. The self-luminous of claim 13, the self-luminous panels are arranged in a row along a first direction;

in the sub-display area of two adjacent self-luminous panels;

the polarization axis of the linear polarizer in one sub-display area makes an angle of 45° degrees with the first direction, the polarization axis of the linear polarizer in the one sub-display area and the polarization axis of the linear polarizer in the other sub-display area are orthogonal to each other.

16. The display panel of claim 12, wherein the first circularly polarizer is in an optical path of incident light and/or emitting light of the sub-display area for the first self-luminous panel, wherein the second circularly polarizer is in an optical path of incident light and/or emitting light of the sub-display area for the second self-luminous panel, and wherein the portion of the sub-display area that is curved and bends toward the back side of the first self-luminous panel is in contact with the portion of the sub-display area that is curved and bends toward the back side of the second self-luminous panel.

17. The display panel of claim 12, wherein the portion of the sub-display area that is curved and bends toward the back side of the first self-luminous panel and the portion of the sub-display area that is curved and bends toward the back side of the second self-luminous panel are symmetrical with each other in a side view of the display panel.

* * * * *